United States Patent
Yamazaki et al.

(10) Patent No.: US 8,866,725 B2
(45) Date of Patent: Oct. 21, 2014

(54) LIQUID CRYSTAL DISPLAY DEVICE VIEWABLE IN DIM AMBIENT LIGHT

(75) Inventors: Shunpei Yamazaki, Tokyo (JP); Jun Koyama, Kanagawa (JP); Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 240 days.

(21) Appl. No.: 12/978,788

(22) Filed: Dec. 27, 2010

(65) Prior Publication Data

US 2011/0157253 A1    Jun. 30, 2011

(30) Foreign Application Priority Data

Dec. 28, 2009 (JP) ................................. 2009-298482

(51) Int. Cl.
 G09G 3/36 (2006.01)
 G02F 1/1335 (2006.01)
 G09G 3/34 (2006.01)

(52) U.S. Cl.
 CPC ........ G02F 1/133555 (2013.01); G09G 3/3648 (2013.01); G09G 3/3406 (2013.01); G09G 3/3413 (2013.01); G09G 2300/0456 (2013.01); G09G 2310/0235 (2013.01); G09G 2320/0247 (2013.01); G09G 2320/0261 (2013.01); G09G 2320/103 (2013.01); G09G 2330/021 (2013.01); G09G 2340/0435 (2013.01); G09G 2340/06 (2013.01); G09G 2360/144 (2013.01)
 USPC ....................................................... 345/100

(58) Field of Classification Search
 USPC .................................................. 345/87–104
 See application file for complete search history.

(56) References Cited

U.S. PATENT DOCUMENTS 5,475,398 A * 12/1995 Yamazaki et al. ............ 345/104
6,169,532 B1   1/2001 Sumi et al.
6,535,985 B1   3/2003 Oshima et al.
(Continued)

FOREIGN PATENT DOCUMENTS

EP    1296174 A    3/2003
EP    1 666 961 A1   6/2006
(Continued)

OTHER PUBLICATIONS

International Search Report, PCT Application No. PCT/JP2010/072312, dated Feb. 1, 2011, 3 pages.
(Continued)

*Primary Examiner* — Chanh Nguyen
*Assistant Examiner* — Sanghyuk Park
(74) *Attorney, Agent, or Firm* — Fish & Richardson P.C.

(57) ABSTRACT

An object is to provide a liquid crystal display device in which image display can be recognized even in an environment where light is dim around the liquid crystal display device. Another object is to provide a liquid crystal display device capable of image display in both modes of a reflective mode in which external light is used as a light source and a transmissive mode in which a backlight is used. One pixel is provided with a pixel electrode having both of a region where light incident through a liquid crystal layer is reflected and a region having a light-transmitting property, so that image display can be performed in both modes of a reflective mode in which external light is used as a light source and a transmissive mode in which a backlight is used.

14 Claims, 16 Drawing Sheets

(56) References Cited

U.S. PATENT DOCUMENTS

| | | | |
|---|---|---|---|
| 6,552,711 B1 | 4/2003 | Nakamura | |
| 6,597,348 B1 | 7/2003 | Yamazaki et al. | |
| 6,683,666 B1 | 1/2004 | Jang et al. | |
| 6,850,216 B2 | 2/2005 | Akimoto et al. | |
| 7,053,969 B2 | 5/2006 | Yamazaki et al. | |
| 7,129,918 B2 | 10/2006 | Kimura | |
| 7,145,536 B1 | 12/2006 | Yamazaki et al. | |
| 7,212,265 B2 | 5/2007 | Eguchi et | |
| 7,286,108 B2 | 10/2007 | Tsuda et al. | |
| 7,317,438 B2 | 1/2008 | Yamazaki et al. | |
| 7,321,353 B2 | 1/2008 | Tsuda et al. | |
| 7,385,579 B2 | 6/2008 | Satake | |
| 7,505,026 B2 | 3/2009 | Baba et al. | |
| 7,525,614 B2 | 4/2009 | Jeong et al. | |
| 7,570,072 B2 | 8/2009 | Hata et al. | |
| 7,612,849 B2 | 11/2009 | Eguchi et al. | |
| 7,643,115 B2 | 1/2010 | Sato et al. | |
| 7,674,650 B2 | 3/2010 | Akimoto et al. | |
| 7,732,819 B2 | 6/2010 | Akimoto et al. | |
| 7,738,055 B2 | 6/2010 | Egi et al. | |
| 7,791,571 B2 | 9/2010 | Ohtani et al. | |
| 7,821,613 B2 | 10/2010 | Kimura | |
| 7,924,276 B2 | 4/2011 | Tsuda et al. | |
| 8,077,276 B2 | 12/2011 | Uchida | |
| 2001/0022584 A1 | 9/2001 | Tsugawa | |
| 2003/0030607 A1* | 2/2003 | Kitagawa et al. | 345/87 |
| 2004/0169625 A1* | 9/2004 | Park et al. | 345/87 |
| 2005/0094067 A1 | 5/2005 | Sakamoto et al. | |
| 2005/0270452 A1 | 12/2005 | Ahn et al. | |
| 2006/0007102 A1 | 1/2006 | Yasuoka et al. | |
| 2006/0044240 A1 | 3/2006 | Takizawa et al. | |
| 2006/0125755 A1 | 6/2006 | Noguchi et al. | |
| 2006/0139528 A1 | 6/2006 | Fujimori et al. | |
| 2006/0187176 A1 | 8/2006 | Yang | |
| 2006/0203154 A1 | 9/2006 | Uchida | |
| 2006/0209002 A1 | 9/2006 | Uchikawa | |
| 2007/0108446 A1 | 5/2007 | Akimoto | |
| 2007/0146592 A1 | 6/2007 | Kimura | |
| 2007/0164961 A1 | 7/2007 | Koyama et al. | |
| 2007/0176875 A1 | 8/2007 | Kageyama et al. | |
| 2007/0279374 A1 | 12/2007 | Kimura et al. | |
| 2008/0074592 A1 | 3/2008 | Araki et al. | |
| 2008/0259099 A1 | 10/2008 | Arai et al. | |
| 2008/0284720 A1 | 11/2008 | Fukutome | |
| 2008/0284929 A1 | 11/2008 | Kimura | |
| 2008/0297676 A1 | 12/2008 | Kimura | |
| 2008/0308805 A1 | 12/2008 | Akimoto et al. | |
| 2008/0308806 A1 | 12/2008 | Akimoto et al. | |
| 2009/0002586 A1 | 1/2009 | Kimura | |
| 2009/0002597 A1* | 1/2009 | Watanabe | 349/62 |
| 2009/0008639 A1 | 1/2009 | Akimoto et al. | |
| 2009/0009455 A1 | 1/2009 | Kimura | |
| 2009/0011611 A1 | 1/2009 | Ichijo et al. | |
| 2009/0059107 A1 | 3/2009 | Nagai et al. | |
| 2009/0174835 A1 | 7/2009 | Lee et al. | |
| 2009/0239335 A1 | 9/2009 | Akimoto et al. | |
| 2009/0298554 A1 | 12/2009 | Kim et al. | |
| 2009/0303170 A1* | 12/2009 | Chung et al. | 345/102 |
| 2009/0305461 A1 | 12/2009 | Akimoto et al. | |
| 2009/0315880 A1 | 12/2009 | Cho et al. | |
| 2010/0084651 A1 | 4/2010 | Yamazaki et al. | |
| 2010/0136743 A1 | 6/2010 | Akimoto et al. | |
| 2010/0155719 A1 | 6/2010 | Sakata et al. | |
| 2010/0156928 A1 | 6/2010 | Lee et al. | |
| 2010/0163863 A1* | 7/2010 | Yaegashi | 257/43 |
| 2011/0115839 A1 | 5/2011 | Takahashi et al. | |
| 2011/0157216 A1 | 6/2011 | Yamazaki et al. | |
| 2011/0157252 A1 | 6/2011 | Yamazaki et al. | |
| 2011/0157254 A1 | 6/2011 | Yamazaki et al. | |
| 2011/0193852 A1 | 8/2011 | Lee et al. | |
| 2011/0210332 A1 | 9/2011 | Jintyou et al. | |
| 2012/0038604 A1 | 2/2012 | Liu et al. | |

FOREIGN PATENT DOCUMENTS

| | | |
|---|---|---|
| JP | 07253566 A | 10/1995 |
| JP | 09-230827 A | 9/1997 |
| JP | 2001-108961 A | 4/2001 |
| JP | 2001-312253 A | 11/2001 |
| JP | 2002-207453 A | 7/2002 |
| JP | 2002-229021 A | 8/2002 |
| JP | 2004-279669 A | 10/2004 |
| JP | 2005-017493 A | 1/2005 |
| JP | 2005-190295 A | 7/2005 |
| JP | 2006119416 A | 5/2006 |
| JP | 2006-162680 A | 6/2006 |
| JP | 2006-189661 A | 7/2006 |
| JP | 2007-096055 A | 4/2007 |
| JP | 2007-123861 A | 5/2007 |
| JP | 2007229153 A | 11/2007 |
| JP | 2008083387 A | 4/2008 |
| JP | 2008-102397 A | 5/2008 |
| JP | 2008261944 A | 10/2008 |
| JP | 2009-047965 A | 3/2009 |
| JP | 2009-058610 A | 3/2009 |
| JP | 2009229967 A | 10/2009 |

OTHER PUBLICATIONS

Written Opinion, PCT Application No. PCT/JP2010/072312, dated Feb. 1, 2011, 4 pages.

* cited by examiner

LIQUID CRYSTAL DISPLAY DEVICE VIEWABLE IN DIM AMBIENT LIGHT

TECHNICAL FIELD

The present invention relates to a liquid crystal display device including a transistor such as a thin film transistor (hereinafter, referred to as a TFT) and a manufacturing method thereof. The present invention further relates to an electronic device on which the liquid crystal display device is mounted as a component.

BACKGROUND ART

In a liquid crystal display device, an active matrix liquid crystal display device in which pixel electrodes are arranged in matrix and transistors are used as switching elements connected to respective pixel electrodes in order to obtain a high-quality image, has attracted attention.

An active matrix liquid crystal display device including transistors, in which metal oxide is used as a channel formation region, as switching elements connected to respective pixel electrodes is already known (Patent Documents 1 and 2).

It is known that active matrix liquid crystal display devices are roughly divided into two kinds: a transmissive liquid crystal display device and a reflective liquid crystal display device.

In a transmissive liquid crystal display device, a backlight such as a cold cathode fluorescent lamp is used, and a state in which light from the backlight is transmitted through a liquid crystal and output to the outside of the liquid crystal display device or a state in which light is not output is selected using optical modulation action of liquid crystal, whereby bright and dark images are displayed. Further, those displays are combined to display an image.

Since a backlight is used in a transmissive liquid crystal display device, it is difficult to recognize display in an environment where external light is strong such as outdoor.

In a reflective liquid crystal display device, a state in which external light, in other words, incident light is reflected at a reflective electrode and output to the outside of the device or a state in which incident light is not output to the outside of the device is selected using optical modulation action of liquid crystal, whereby bright and dark images are displayed. Further, those displays are combined to display an image.

A reflective liquid crystal display device has an advantage in that power consumption is lower as compared to that of a transmissive liquid crystal display device because a backlight is not used, and demand for a reflective liquid crystal display device used for a portable information terminal has increased.

Since a reflective liquid crystal display device utilizes external light, it is suitable for image display in an environment where external light is strong such as outdoor. On the other hand, it is difficult to recognize the display in an environment where light is dim around the liquid crystal display device; that is, external light is weak.

REFERENCE

Patent Document

[Patent Document 1] Japanese Published Patent Application No. 2007-123861
[Patent Document 2] Japanese Published Patent Application No. 2007-96055

DISCLOSURE OF INVENTION

An object of one embodiment of the present invention is to provide a liquid crystal display device of which image display can be recognized even in an environment where light is dim around the liquid crystal display device.

Another object is to provide a liquid crystal display device capable of image display in both modes of a reflective mode in which external light is used as a light source and a transmissive mode in which a backlight is used.

One pixel is provided with a pixel electrode having both of a region where incident light through a liquid crystal layer is reflected (also referred to as a reflective region) and a region having a light-transmitting property (also referred to as a transmissive region), so that image display can be performed in both modes of a reflective mode in which external light is used as a light source and a transmissive mode in which a backlight is used.

This liquid crystal display device is switched to the reflective mode and a still image is displayed when there is external light which is sufficiently bright, whereby power consumption can be reduced.

When the brightness is insufficient and the light is dim though there is external light, the backlight is slightly lit and display is performed in the reflective mode, so that image display can be performed.

When there is weak or no external light, the liquid crystal display device is switched to the transmissive mode and the backlight is lit, so that image display can be performed.

In addition, it is preferable that a sensor be provided which detects the brightness around the liquid crystal display device, and switching of the reflective mode, the transmissive mode, or on and off of the backlight and adjustment of the amount of light be performed in accordance with data obtained by the sensor.

As a light source of the backlight, a plurality of light-emitting diodes (LEDs) are preferably used, with which power consumption can be reduced than using a cold cathode fluorescent lamp and intensity of light can be adjusted. Intensity of light is partially adjusted by using LEDs for the backlight, so that image display with high contrast and high color visibility can be performed.

One embodiment of the present invention disclosed in this specification is a liquid crystal display device including a display panel, a backlight portion, and an image processing circuit. The display panel includes a plurality of pixels, each provided with a pixel electrode which is provided with both of a transmissive region and a reflective region and controls alignment of a liquid crystal and a transistor connected to the pixel electrode, and a first driver circuit configured to control the plurality of pixels. The image processing circuit includes a memory circuit which stores image signals, a comparison circuit which compares the image signals in successive frame periods stored in the memory circuit and calculates a difference, and a display control circuit. The backlight portion includes a plurality of light emitting elements and a second driver circuit which temporally controls the plurality of light emitting elements. The liquid crystal display device includes a moving-image display mode in which the comparison circuit judges successive frame periods during which the difference is detected as a moving-image display period, the image processing circuit outputs a first signal to the display panel, the first driver circuit drives the display panel, the image processing circuit outputs a second signal to the backlight portion, and the second driver circuit drives the backlight portion, and a still-image display mode in which the comparison circuit judges successive frame periods during which the difference is not detected as a still-image display period and the image processing circuit stops the output of signals to the display panel and the backlight portion.

In the above liquid crystal display device, a photometric circuit may be further included, and the still-image display mode and the moving-image display mode are switched depending on the brightness of external light, and lighting and non-lighting of the backlight portion may be controlled.

In the above liquid crystal display device, the pixel electrode includes a reflective electrode and a transparent electrode partly in contact with and overlapped with the reflective electrode.

In the above liquid crystal display device, the transistor preferably includes an oxide semiconductor layer as an active layer.

With the above structure, at least one of the above problems can be resolved.

It is also one feature of the present invention that a pixel electrode which is provided with a plurality of structures, a reflective electrode on a side surface of the structure, and a transparent electrode (an electrode having a light-transmitting property with respect to visible light) over the structure is used for a pixel.

One embodiment of the present invention includes an electronic device to which the above liquid crystal display device is applied.

Another embodiment of the present invention is an electronic device including the above liquid crystal display device and a solar battery, in which the solar battery is attached to a display panel so as to be opened and closed freely, and electric power from the solar battery is supplied to the display panel, a backlight portion, and an image processing circuit.

A liquid crystal display device capable of image display in accordance with environments where the brightness of external light varies can be provided. Low power consumption can be realized in display of a still image.

BEST MODE FOR CARRYING OUT THE INVENTION

Hereinafter, embodiments of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments.

Embodiment 1

Figure 1:
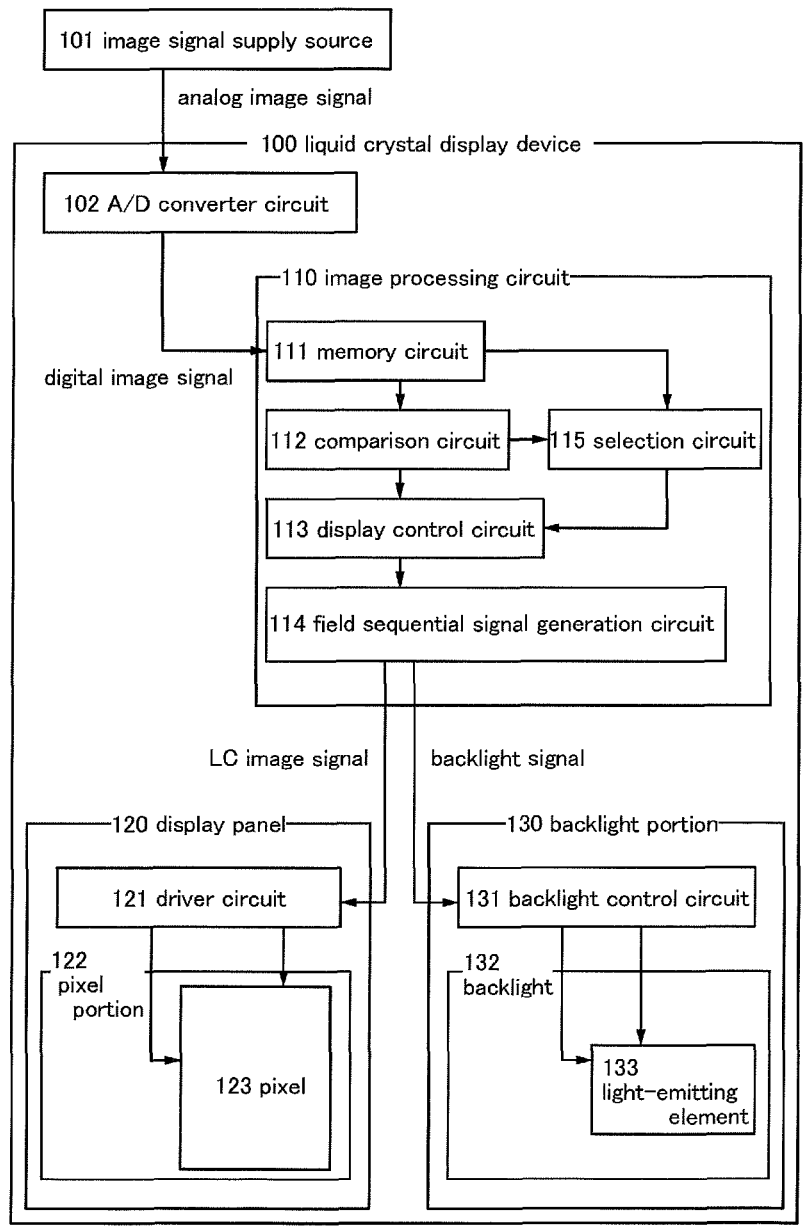
FIG. 1 is a conceptual diagram illustrating one mode of a liquid crystal display device.

In this embodiment, a liquid crystal display device including a still-image display mode and a moving-image display mode will be described with reference to FIG. 1.

In this specification, a still-image display mode refers to an operation performed when the liquid crystal display device judges an image signal input as a still image, and a moving-image display mode refers to an operation performed when the liquid crystal display device judges an image signal input as a moving image.

A liquid crystal display device 100 according to this embodiment includes an A/D converter circuit 102, an image processing circuit 110, a display panel 120, and a backlight portion 130.

The image processing circuit 110 includes a memory circuit 111, a comparison circuit 112, a display control circuit 113, a field sequential signal generation circuit 114 and a selection circuit 115.

The display panel 120 includes a driver circuit 121 and a pixel portion 122. In the pixel portion 122, a plurality of pixels 123 each connected to a scan line and a signal line are arranged in matrix.

The pixel 123 includes a transistor, a pixel electrode connected to the transistor, and a capacitor. A liquid crystal layer is held between the pixel electrode and a counter electrode facing the pixel electrode so that a liquid crystal element is formed. The pixel electrode includes a region (reflective region) which reflects light incident through the liquid crystal layer and a region (transmissive region) which has a light-transmitting property.

An example of a liquid crystal element is an element which controls transmission and non-transmission of light by optical modulation action of liquid crystals. The element can include a pair of electrodes and a liquid crystal layer. The optical modulation action of liquid crystals is controlled by an electric field applied to the liquid crystals (that is, a vertical electric field). Note that specifically, the following can be used for a liquid crystal element, for example: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like. In addition, the following can be used as a diving method of a liquid crystal: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like.

The backlight portion 130 includes a backlight control circuit 131 and a backlight 132. Light-emitting elements 133 are arranged in the backlight 132.

In this embodiment, the backlight 132 includes a plurality of light-emitting elements 133 of different emission colors. As a combination of different emission colors, for example, three kinds of light-emitting elements of red (R), green (G), and blue (B) can be used. A full-color image can be displayed by using the three primary colors: R, Gy and B.

Another light-emitting element which emits a color exhibited by making a plurality of light-emitting elements selected from the light-emitting elements of R, and B emit light at the same time (for example, yellow (Y) exhibited by R and G, cyan (C) exhibited by G and B, magenta (M) exhibited by B and R, or the like) may be provided in addition to the light-emitting elements of R, G, and B.

A light-emitting element which emits light of a color other than the three primary colors may be added, so that color reproduction characteristics of the liquid crystal display device are improved. A color which can be exhibited using the light-emitting elements of R, G, and B is limited to a color represented inside a triangle made by three points on the chromaticity diagram, each corresponding to the emission color of each of the light-emitting elements. Therefore, another light-emitting element of a color positioned outside the triangle on the chromaticity diagram is added, whereby color reproduction characteristics of the liquid crystal display device can be improved.

For example, a light-emitting element emitting the following color can be used in addition to the light-emitting elements of R, G, and B in the backlight 132: deep blue (DB) represented by a point positioned outside the triangle in a direction from the center of the chromaticity diagram toward a point on the chromaticity diagram corresponding to the blue-light-emitting element B or deep red (DR) represented by a point positioned outside the triangle in a direction from the center of the chromaticity diagram toward a point on the chromaticity diagram corresponding to the red-light-emitting element R.

Next, a signal flow in the liquid crystal display device in this embodiment is described.

An analog image signal is input to the liquid crystal display device 100 from an image signal supply source 104. The analog image signal includes an image signal such as signals corresponding to red (R), green (G), and blue (B).

In the A/D converter circuit 102, the analog image signal is converted into a digital image signal (digital image signal "Data") and the digital image signal is output to the image processing circuit 110. When the image signal is converted into a digital image signal in advance, detection of a difference of the image signals that is to be performed later can be easily performed, which is preferable.

The image processing circuit 110 generates an LC image signal and a backlight signal from the digital image signal "Data" which is input. The LC image signal controls the display panel 120, and the backlight signal controls the backlight portion 130.

The memory circuit 111 provided in the image processing circuit 110 includes a plurality of frame memories for storing image signals for a plurality of frames. The number of frame memories included in the memory circuit 111 is not particularly limited as long as the image signals for a plurality of frames can be stored. Note that the frame memory may be formed using a memory element such as dynamic random access memory (DRAM) or static random access memory (SRAM).

Note that the number of frame memories is not particularly limited as long as an image signal can be stored for each frame period. In addition, the image signals stored in the frame memories are selectively read out by the comparison circuit 112 and the display control circuit 113.

The comparison circuit 112 is a circuit which selectively reads out image signals in successive frame periods stored in the memory circuit 111, compares the image signals in the successive frame periods in each pixel, and detects a difference thereof.

Whether or not a difference is detected determines the operation of the display control circuit 113 and the selection circuit 115. By the comparison between the image signals in the comparison circuit 112, when a difference is detected in any pixel, successive frame periods during which the difference is detected is judged as a moving image display period. On the other hand, by the comparison between the image signals in the comparison circuit 112, when differences are not detected in all the pixels, successive frame periods during which the difference is not detected is judged as a still image display period. In other words, in the comparison circuit 112, by detection of the differences in the comparison circuit 112, the image signals in the successive frame periods are judged as images signals for displaying moving images or image signals for displaying still images.

Note that the difference obtained by the comparison may be set to be detected when the difference exceeds a certain level. The comparison circuit 112 may be set to judge detection of a difference by the absolute value of the difference.

Although, in this embodiment, the structure in which a moving image or a still image is judged by detection of the difference of the image signals in successive frame periods by the comparison circuit 112 is described, a structure in which a display of a moving image or a still image is switched in accordance with a signal for switching a still image or a moving image supplied to the selection circuit 115 from the outside may be used.

Note that a moving image refers to an image which is recognized as a moving image by human eyes by switching a plurality of images at high speed which are time-divided into a plurality of frame periods. Specifically, an image can be recognized as a moving image with less flicker by human eyes by switching images at least 60 times (60 frames) per second. In contrast, a still image refers to images which do not change in successive frame periods, for example, in the n-th frame and (n+1)-th frame, unlike a moving image or a partial moving image containing both of a moving image and still image in a screen, though a plurality of images which are time-divided into a plurality of frame periods are switched at high speed.

The selection circuit 115 includes a plurality of switches such as a switch formed using a transistor. The selection circuit 115 is a circuit for selecting the image signals from the frame memories in the memory circuit 111 in which the image signals are stored, and for outputting the image signals to the display control circuit 113 when the difference of the image signals is detected by calculation in the comparison circuit 112, that is, when an image displayed in the successive frame periods is a moving image.

When the difference of the image signals is not detected by calculation in the comparison circuit 112, that is, when an image displayed in the successive frame periods is a still image, the selection circuit 115 does not output the image signals to the display control circuit 113. In the case of the still image, a structure may be employed in which the selection circuit 115 does not output an image signal to the display control circuit 113 from the frame memory; thus, power consumption can be reduced.

In the liquid crystal display device of this embodiment, a mode performed in such a way that the comparison circuit 112 judges the image signal as a still image is described as a still-image display mode, and a mode performed in such a way that the comparison circuit 112 judges the image signal as a moving image is described as a moving-image display mode.

The image processing circuit described in this embodiment may include a mode-switching circuit. The mode-switching circuit has a function of switching between a moving-image display mode and a still-image display mode in such a manner that a user of the liquid crystal display device selects an operation mode of the liquid crystal display device manually or using an external connection apparatus.

The selection circuit 115 can output the image signal to the display control circuit 113 in accordance with a signal input from the mode-switching circuit.

For example, in the case where a mode-switching signal is input to the selection circuit 115 from the mode-switching circuit while an operation is performed in a still-image display mode, even when the comparison circuit 112 does not detect the difference of the image signals in successive frame periods, the selection circuit 115 can be operated in a mode in which image signals which are input are sequentially output to the display control circuit 113, that is, in a moving-image display mode. In the case where a mode-switching signal is input to the selection circuit 115 from the mode-switching circuit while an operation is performed in a moving-image display mode, even when the comparison circuit 112 detects the difference of the image signals in successive frame periods, the selection circuit 115 can be operated in a mode in which only an image signal of one selected frame is output, that is, in a still-image display mode. As a result, in the liquid crystal display device of this embodiment, one frame among moving images is displayed as a still image.

The display control circuit 113 is a circuit for optimizing the image signal selected by the selection circuit 115 in accordance with detection of the difference in the comparison circuit 112 for the display panel 120 and the backlight portion 130.

For example, even in the case where a digital image signal includes signals of R, and B, it is preferable that the image signal be optimized in accordance with light-emitting characteristics of the light-emitting elements of R, G, and B provided in the backlight 132. In the case where a light-emitting element other than those of R, G, and B is provided in the backlight 132, the display control circuit 113 generates a signal for driving the light-emitting element from the original image signal, so that color reproduction characteristics of the liquid crystal display device are optimized.

For example, in the case where a digital image signal "Data (1)" including R, G, and B is converted into a digital image signal "Data (4)" which is suitable for the backlight 132 provided with light-emitting elements of five colors: R, G, B, DR, and DB, the display control circuit 113 generates a digital image signal "Data (2)" expressed using the light-emitting elements DR and DB from the original digital image signal "Data (1)". At the same time, a digital image signal "Data (3)" is generated, by subtracting a digital image signal expressed using the light-emitting elements DR and DB from the original digital image signal "Data (1)". Then, the digital image signal "Data (4)" is generated, which includes the digital image signal "Data (2)" expressed using the light-emitting elements DR and DB and the digital image signal "Data (3)" expressed using the light-emitting elements R, G, and B and is optimized for the backlight 132 provided with the light-emitting elements of five colors: R, G, B, DR, and DB.

The field sequential signal generation circuit 114 is a circuit for controlling the driver circuit 121 of the display panel 120 and the backlight control circuit 131 of the backlight portion 130 in accordance with the image signal generated in the display control circuit 113.

The field sequential signal generation circuit 114 is also a circuit for controlling switching between supplying and stop of a control signal such as a start pulse SP and a clock signal CK for synchronizing the display panel 120 and the backlight portion 130 with each other.

Next, a method of controlling the driver circuit 121 of the display panel 120 and the backlight control circuit 131 of the backlight portion 130 using the field sequential signal generation circuit 114 is described. Operation of the field sequential signal generation circuit 114 differs between the case where the comparison circuit 112 judges the image signal as a moving image and the case where the comparison circuit 112 judges the image signal as a still image. Note that, here, the image signal includes R, G, and B, and the backlight 132 includes light-emitting elements (specifically, LEDs) R, and B.

First, the operation of the field sequential signal generation circuit 114 in the case where the comparison circuit 112 judges the image signal as a moving image is described. In the field sequential signal generation circuit 114, an image signal including a moving image is processed in a moving-image display mode. Specifically, the field sequential signal generation circuit 114 compresses each of the image signals optimized by the display control circuit 113 by $1/(3n)$ with respect to the time axis. Note that n corresponds to the n used for the case where one frame is divided into n subframes. Then, field sequential color image signals (R1, G1, B1, R2, G2, and B2) are supplied to the driver circuit 121, which correspond to R, and B compressed by $1/(3n)$ with respect to the time axis.

The field sequential signal generation circuit 114 supplies a backlight signal to the backlight control circuit 131. The backlight signal is a signal for lighting the light-emitting elements R, and B provided in the backlight 132 and makes a pair with each of the field sequential color image signals corresponding to R, G, and B.

The display panel 120 and the backlight portion 130 operate in synchronization with a synchronization signal generated by the field sequential signal generation circuit 114, so that a moving image is displayed.

On the other hand, in the case where the comparison circuit 112 judges the image signal as a still-image, the field sequential signal generation circuit 114 does not generate a field sequential color image signal and supplies a still-image data for one frame to the driver circuit 121 of the display panel 120.

After that, the field sequential signal generation circuit 114 stops the supply of image signals and various control signals to the driver circuit 121 and the backlight control circuit 131.

In addition, the liquid crystal display device described in this embodiment as an example includes a backlight lighting circuit and a photometric circuit. The backlight lighting circuit and the photometric circuit may be connected to the backlight control circuit 131. The backlight lighting circuit is a circuit which inputs a signal for turning the backlight on and off performed manually or using an external connection apparatus by a user of the liquid crystal display device. The photometric circuit is a circuit which measures brightness of an environment where the liquid crystal display device is used.

For example, in the case where the liquid crystal display device described in this embodiment is used in a dim environment, a signal is input to the backlight control circuit 131 via the backlight lighting circuit or the photometric circuit, so that the backlight can be lit. Note that a threshold value may be set for the photometric circuit so that the backlight is lit when the brightness of a usage environment is less than the threshold value.

With the structure of this embodiment, frequent writings of image signals can be eliminated in a period in which a still image is displayed. In addition, power consumption is extremely low because a still image can be displayed without use of the backlight.

In the liquid crystal display device illustrated in this embodiment, a full-color image can be displayed without using a color filter, in addition to display of a still image with low power consumption. Light use efficiency is high because a color filter does not absorb light from the backlight, whereby power consumption is suppressed even in display of a full-color image.

When an image displayed by plural times of writing of an image signal is seen, human eyes see images which are switched plural times. Accordingly, such switching might cause eye strain. As described in this embodiment, the number of writings of image signals is reduced, whereby an effect of reducing eye strain is obtained.

This embodiment can be combined with any of the other embodiments in this specification as appropriate.

Embodiment 2

Figure 2:
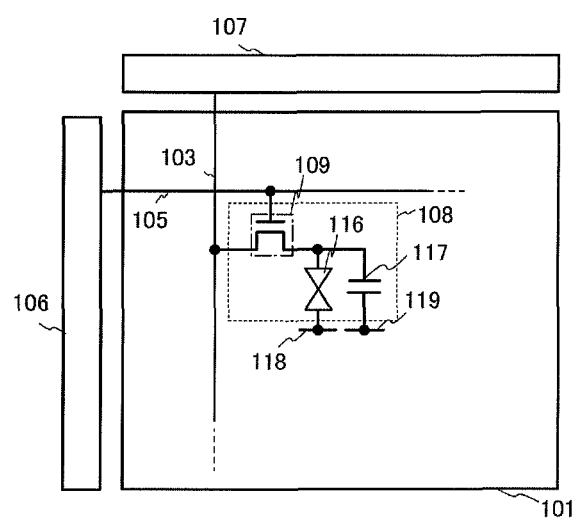
FIG. 2 illustrates one mode of a liquid crystal display device.

In this embodiment, a driving method of a liquid crystal display device will be described using a pixel connection diagram, a timing chart, and the like. First, FIG. 2 is a schematic view of a display panel of a liquid crystal display device. In FIG. 2, the display panel includes a pixel portion 101, a scan line 105 (also referred to as a gate line), a signal line 103 (also referred to as a data line), a pixel 108, a common electrode 118, a capacitor line 119, a scan line driver circuit 106, and a signal line driver circuit 107.

The pixel 108 includes a pixel transistor 109, a liquid crystal element 116, and a capacitor 117. A gate of the pixel transistor 109 is connected to the scan line 105, a first terminal serving as one of a source and a drain of the pixel transistor 109 is connected to the signal line 103, and a second terminal serving as the other of the source and the drain of the pixel transistor 109 is connected to one electrode of the liquid crystal element 116 and a first electrode of the capacitor 117. The other electrode of the liquid crystal element 116 is connected to the common electrode 118. A second electrode of the capacitor 117 is connected to the capacitor line 119. It is preferable that a thin film transistor (TFT) including a thin oxide semiconductor layer be used for the pixel transistor 109.

Note that a thin film transistor is an element having at least three terminals of gate, drain, and source and includes a channel region between a drain region and a source region, and current can flow through the drain region, the channel region, and the source region. Here, since the source and the drain of the transistor may change depending on the structure, the operating condition, and the like of the transistor, it is difficult to define which is a source or a drain. Therefore, in this document (the specification, the claims, the drawings, and the like), a region functioning as a source and a drain is not called the source or the drain in some cases. In such a case, for example, one of the source and the drain may be referred to as a first terminal and the other may be referred to as a second terminal. Alternatively, one of the source and the drain may be referred to as a first electrode and the other may be referred to as a second electrode. Further alternatively, one of the source and the drain may be referred to as a source region and the other thereof may be called a drain region.

The scan line driver circuit 106 and the signal line driver circuit 107 are preferably provided over the substrate over which the pixel portion 101 is formed; however, these are not necessarily formed over the substrate over which the pixel portion 101 is formed. When the scan line driver circuit 106 and the signal line driver circuit 107 are provided over the substrate over which the pixel portion 101 is formed, the number of the connection terminals for connection to the outside and the size of the liquid crystal display device can be reduced.

Note that the pixels 108 are provided (arranged) in matrix. Here, description that the pixels 108 are provided (arranged) in matrix includes the case where the pixels 108 are arranged in a straight line and the case where the pixels 108 are arranged in a jagged line, in a longitudinal direction or a lateral direction.

Note that when it is explicitly described that "A and B are connected," the case where A and B are electrically connected, the case where A and B are functionally connected, and the case where A and B are directly connected are included therein.

Next, the operation of the display panel together with the operation of the backlight will be described with reference to FIG. 3A. As described in the above embodiment, the operation of the display panel is roughly divided into a moving-image display period 301 and a still-image display period 302.

The cycle of one frame period (or frame frequency) is preferably less than or equal to 1/60 sec (more than or equal to 60 Hz) in the moving-image display period 301. The frame frequency is increased, so that flickering is not sensed by a viewer of an image. In the still-image display period 302, the cycle of one frame period is extremely long, for example, longer than or equal to one minute (less than or equal to 0.017 Hz), so that eye strain can be reduced compared to the case where the cycle of one frame period of the same image is shorter.

When an oxide semiconductor is used for a semiconductor layer of the pixel transistor 109, an off-state current of the transistor can be reduced. Accordingly, an electrical signal such as an image signal can be held for a longer period in the pixel, and a writing interval can be set longer. Therefore, the cycle of one frame period can be set longer, and the frequency of refresh operations in the still-image display period 302 can be reduced, whereby an effect of suppressing power consumption can be further increased. In a transistor including an oxide semiconductor, relatively high field-effect mobility can be obtained, whereby writing time can be shortened and high-speed operation is possible.

Figure 3A:
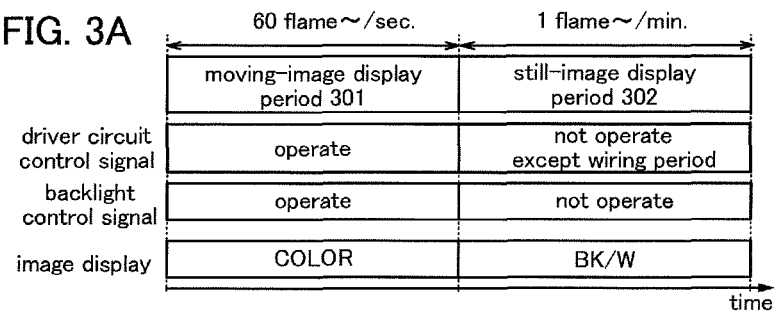
FIGS. 3A to 3C each illustrate one mode of a driving method of a liquid crystal display device.

In the moving-image display period 301 illustrated in FIG. 3A, as described in the above embodiment, a driver circuit control signal for displaying a moving image is supplied to the driver circuit by field sequential driving, whereby the driver circuit operates. In addition, in the moving-image display period 301 illustrated in FIG. 3A, a backlight signal for performing color display is supplied to the backlight by field sequential driving, whereby the backlight operates. In this manner, color display of a moving image can be performed on the display panel.

As described in the above embodiment, in the still-image display period 302 illustrated in FIG. 3A, a driver circuit control signal for writing an image signal of a still image in a gray scale of black and white (denoted by BK/W in the drawing) is supplied to the driver circuit by transmission or non-transmission of reflected light, whereby the driver circuit operates. Supply of the driver circuit control signal is stopped in the period other than the period of writing the image signal, whereby power consumption can be reduced. In the still-image display period 302 illustrated in FIG. 3A, display comes to be visible utilizing reflected external light; therefore, the backlight is not operated by the backlight signal. Thus, a still image in a gray scale of black and white can be displayed on the display panel.

Next, the moving-image display period 301 and the still-image display period 302 in FIG. 3A will be described in details with reference to timing charts of FIG. 3B and FIG. 3C, respectively. The timing charts illustrated in FIG. 3B and FIG. 3C are exaggerated for description, and each signal does not operate in synchronization, except for the case where there is specific description.

Figure 3B:
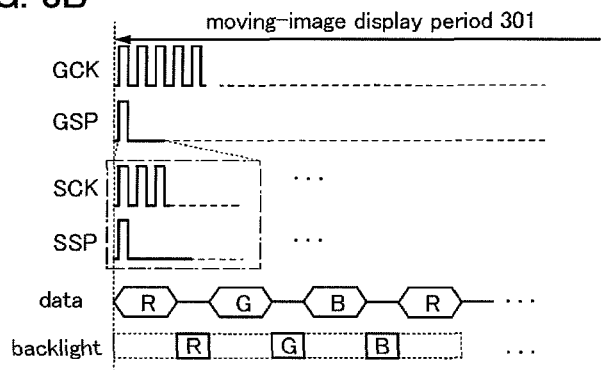
Figure 3C:
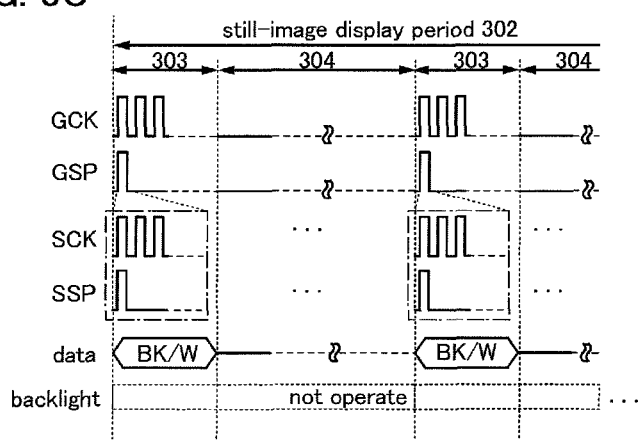

First, FIG. 3B is described. FIG. 3B illustrates a clock signal GCK which is supplied to the scan line driver circuit 106, a start pulse GSP, a clock signal SCK which is supplied to the signal line driver circuit 107, a start pulse SSP, an image signal "data", and a lighting state of the backlight in the moving-image display period 301 as an example. As the backlight, a structure in which three colors of R, G, and B are sequentially lit will be described as an example of a plurality of light-emitting elements. Low power consumption and life extension can be achieved using an LED as the backlight.

In the moving-image display period 301, the clock signal GCK becomes a clock signal which is always supplied. The start pulse GSP becomes a pulse corresponding to vertical synchronization frequency. The clock signal SCK becomes a clock signal which is always supplied. The start pulse SSP becomes a pulse corresponding to one gate selection period. A moving image is displayed by field sequential driving in the moving-image display period 301. Therefore, image signals are changed through repetition of the following operations. An image signal for displaying R (red) is written to each pixel, the backlight of R is lit, then an image signal for displaying G (green) is written to each pixel, the backlight of G is lit, then an image signal for displaying B (blue) is written to each pixel, and the backlight of B is lit. In this manner, a viewer can see color display of a moving image.

Next, FIG. 3C will be described. In FIG. 3C, the still-image display period 302 is divided into a still-image writing period 303 and a still-image holding period 304 for description.

In the still-image writing period 303, the clock signal GCK serves as a clock signal for writing to one screen. The start pulse GSP serves as a pulse for writing to one screen. The clock signal SCK serves as a clock signal for writing to one screen. The start pulse SSP serves as a pulse for writing to one screen. Note that in the still-image writing period 303, a still image is displayed by an image signal BK/W for displaying an image in a grayscale of black and white utilizing reflected light; therefore, the backlight for color display is not lit.

In the still-image holding period 304, supply of the clock signal GCK, the start pulse GSP, the clock signal SCK, and the start pulse SSP is stopped in order to stop the operation of the signal line driver circuit 107 and the scan line driver circuit 106. Therefore, in the still-image holding period 304, power consumption can be reduced and lower power consumption can be achieved. In the still-image holding period 304, the image signal written to the pixel in the still-image writing period 303 is held by the pixel transistor 109 with extremely low off-state current; therefore, a still image in a grayscale of black and white can be held for longer than or equal to one minute. In this period, the backlight for color display is not lit. In the still-image holding period 304, before a held image signal in the capacitor is changed as a certain period passes, another still-image writing period 303 is provided, and an image signal which is the same as the image signal of the previous period is written (refresh operation), and the still-image holding period 304 may be provided again.

In the liquid crystal display devices described in this embodiment, power consumption can be reduced when a still image is displayed.

This embodiment can be implemented in appropriate combination with the structures described in the other embodiments.

Embodiment 3

In this embodiment, a structure of a driving method of the liquid crystal display device which is different from that of the driving method described in Embodiment 2 will be described using a timing chart and the like. First, a timing chart illustrated in FIG. 4A is used to describe a driving method of the backlight in the moving-image display period 301 described in Embodiment 2.

Figure 4A:
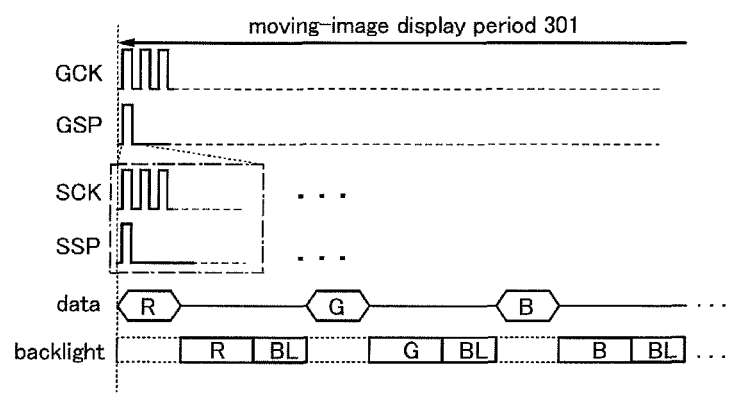
FIGS. 4A and 4B each illustrate one mode of a driving method of a liquid crystal display device.

The timing chart in FIG. 4A is different from that in FIG. 3B in that a non-lighting period of the backlight (BL in FIG. 4A) is provided after the lighting of the backlight following the writing of an image signal. Flicker of color or the like can be reduced and visibility can be improved by providing a period during which the backlight is turned off before writing the next image signal.

Figure 4B:
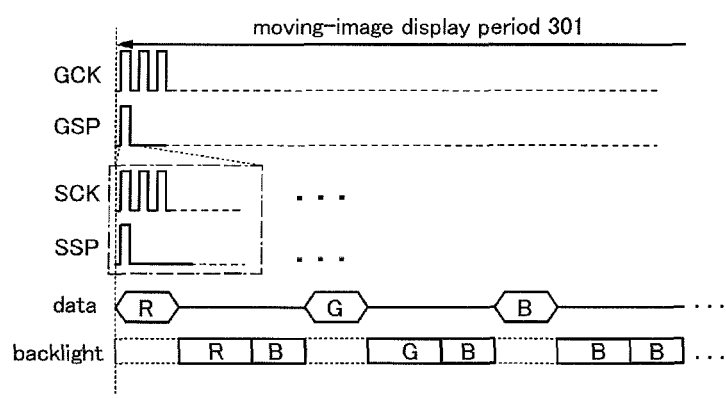

FIG. 4B illustrates a structure different from that in FIG. 4A. The timing chart in FIG. 4B is different from that in FIG. 4A in that a light-emitting period of blue (B) is provided instead of the non-lighting period BL of the backlight. Flicker of color or the like can be reduced and visibility can be improved by providing a light-emitting period of blue before writing the next image signal, similarly to the case where a non-lighting period is provided.

An example of using three colors of R, G, and B is described in Embodiment 2 as a plurality of light-emitting elements used for the backlight; however, another structure may be employed. For example, light-emitting elements 311 of five colors can be used to control the backlight as illustrated in FIG. 5A.

Figure 5A:
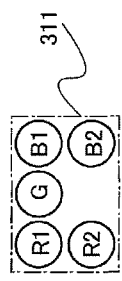
FIGS. 5A and 5B each illustrate one mode of a driving method of a liquid crystal display device.

In the light-emitting elements 311 in FIG. 5A, a first red-light-emitting element R1, a second red-light-emitting element R2, a green-light-emitting element G, a first blue-light-emitting element B1, and a second blue-light-emitting element B2 are illustrated as an example. Next, control of the lighting of the backlight illustrated in FIG. 5A in the moving-image display period 301 described in Embodiment 2 will be described in FIG. 5B, similarly to the descriptions of FIGS. 4A and 4B.

Figure 5B:
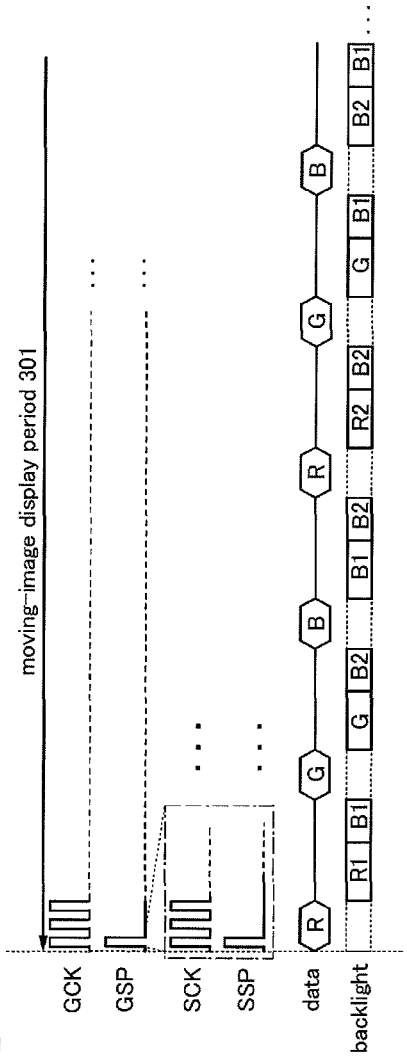

In FIG. 5B, the first red-light-emitting element R1 and the first blue-light-emitting element B1 are lit, as the lighting of the backlight following the writing of an image signal of R. The green-light-emitting element G and the second blue-light-emitting element B2 are lit, as the lighting of the backlight following the writing of an image signal of G. The first blue-light-emitting element B1 and the second blue-light-emitting element B2 are lit, as the lighting of the backlight following the writing of an image signal of B. The second red-light-emitting element R2 and the second blue-light-emitting element B2 are lit, as the lighting of the backlight following the writing of an image signal of R. The green-light-emitting element G and the first blue-light-emitting element B1 are lit, as the lighting of the backlight following the writing of an image signal of G. The second blue-light-emitting element B2 and the first blue-light-emitting element B1 are lit, as the lighting of the backlight following the writing of an image signal of B.

With the structure in FIG. 5B, a light-emitting period of blue can be provided in a period during which color elements of R, G, and B are switched, whereby the same effect can be obtained as in FIG. 4B. In addition, light-emitting elements of materials with different color coordinates can be used for the first red-light-emitting element R1 and the second red-light-emitting element R2, and the first blue-light-emitting element B1 and the second blue-light-emitting element B2, so that color expression range can be expanded in color display.

In the liquid crystal display device described in this embodiment, power consumption can be reduced when a still image is displayed.

This embodiment can be implemented in appropriate combination with the structures described in the other embodiments.

Embodiment 4

Figure 6:
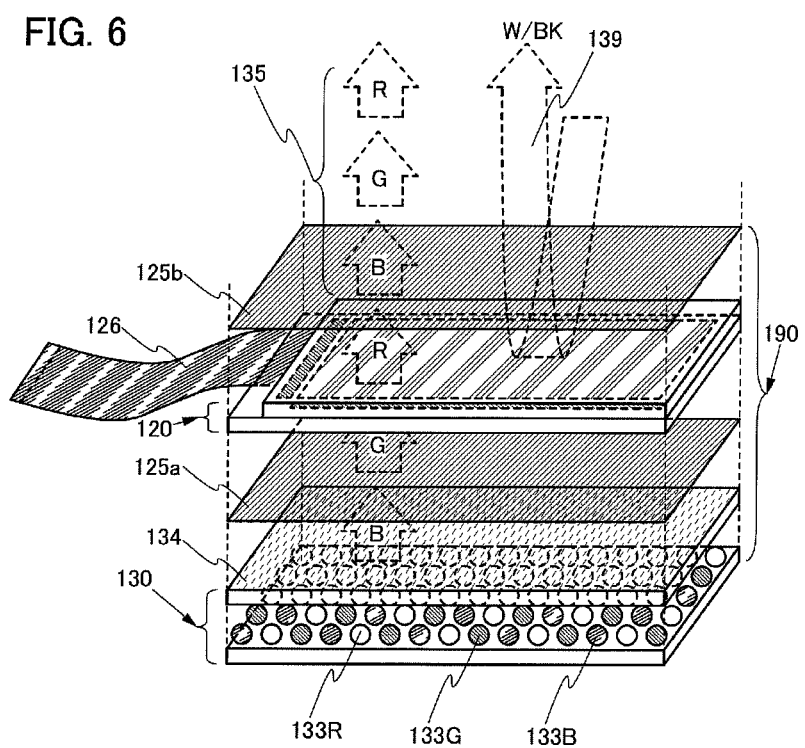
FIG. 6 illustrates one mode of a liquid crystal display device.

FIG. 6 illustrates a structure of a liquid crystal display module 190. The liquid crystal display module 190 includes a backlight portion 130, a display panel 120 in which liquid crystal elements are arranged in matrix, and a polarizing plate 125a and a polarizing plate 125b with the display panel 120 positioned therebetween. The backlight portion 130 may be a backlight portion including light-emitting elements, for example, LEDs of three primary colors (133R, 133G, and 133B) arranged in matrix and a diffusing plate 134 provided between the display panel 120 and the light-emitting elements. In addition, a flexible printed circuit (FPC) 126 serving as an external input terminal is electrically connected to a terminal portion provided in the display panel 120.

In FIG. 6, three colors of light 135 are schematically denoted by arrows (R, G, and B). Pulsed light of different colors sequentially emitted from the backlight portion 130 is modulated by a liquid crystal element of the display panel 120 which operates in synchronization with the backlight portion 130, and reaches a viewer through the liquid crystal display module 190. The observer perceives the sequentially emitted light as an image.

Further, FIG. 6 schematically illustrates a state in which external light 139 is transmitted through the liquid crystal element in the display panel 120 and reflected by a lower electrode below the liquid crystal element. The intensity of the light transmitted through the liquid crystal element is modulated by an image signal; therefore, a viewer can perceive an image also with reflected light of the external light 139.

Figure 7A:
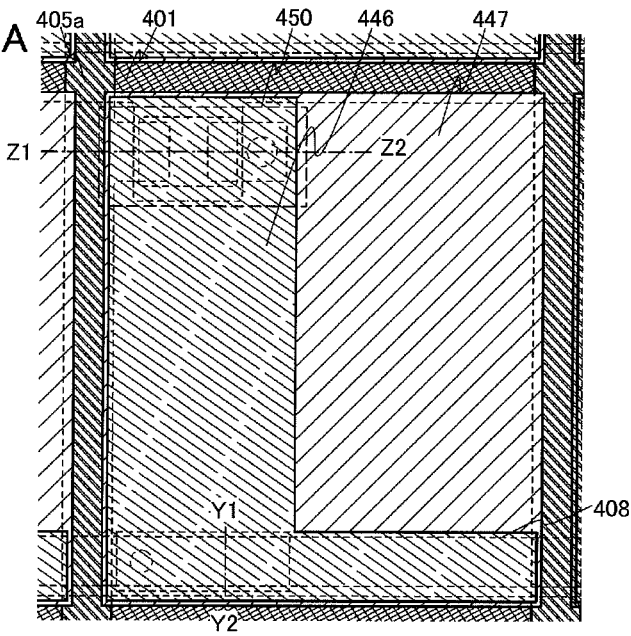
FIGS. 7A and 7B illustrate one mode of a liquid crystal display device.
Figure 7B:
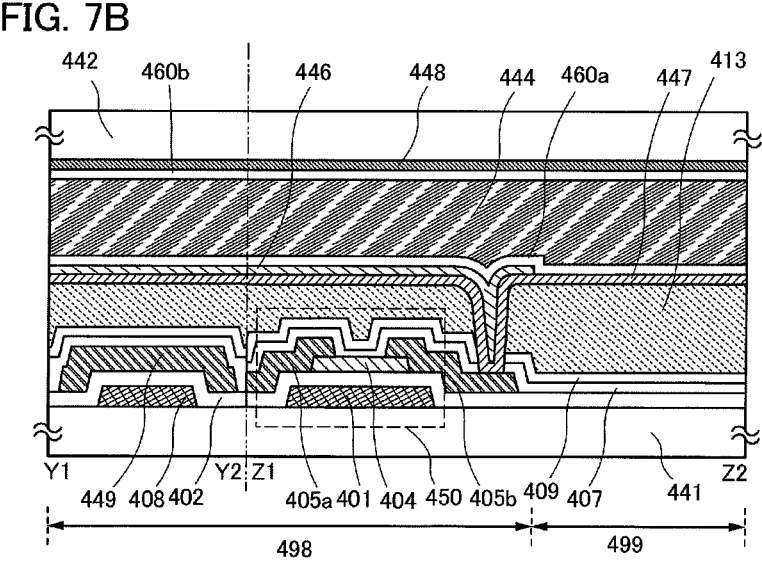

FIG. 7A is a plan view of a display region in the display panel 120 and illustrates one pixel thereof. FIG. 7B is a cross-sectional view taken along lines Y1-Y2 and Z1-Z2 of FIG. 7A.

In FIG. 7A, a plurality of source wiring layers (including a source or drain electrode layer 405a) is arranged in parallel (extends upward and downward in the drawing) and spaced from each other. A plurality of gate wiring layers (including a gate electrode layer 401) is arranged so as to extend in a direction generally perpendicular to the source wiring layers (the horizontal direction in the drawing) and spaced from each other. Capacitor wiring layers 408 are arranged adjacent to the plurality of gate wiring layers and extend in a direction generally parallel to the gate wiring layers, that is, in a direction generally perpendicular to the source wiring layers (the horizontal direction in the drawing).

The liquid crystal display device in FIGS. 7A and 7B is a semi-transmissive liquid crystal display device in which a pixel region includes a reflective region 498 and a transmissive region 499. In the reflective region 498, a reflective electrode layer 446 is stacked over a transparent electrode layer 447 as a pixel electrode layer, and in the transmissive region 499, only the transparent electrode layer 447 is provided as a pixel electrode layer. Note that an example in which the transparent electrode layer 447 and the reflective electrode layer 446 are stacked in that order over an interlayer film 413 is illustrated in FIGS. 7A and 7B; however, a structure in which the reflective electrode layer 446 and the transparent electrode layer 447 are stacked in that order over the interlayer film 413 may be employed. Insulating films 407 and 409 and the interlayer film 413 are provided over a transistor 450. The transparent electrode layer 447 and the reflective electrode layer 446 are electrically connected to the transistor 450 through an opening (contact hole) provided in the insulating films 407 and 409 and the interlayer film 413.

As illustrated in FIG. 7B, a common electrode layer 448 (also referred to as a counter electrode layer) is formed on a second substrate 442 and faces the transparent electrode layer 447 and the reflective electrode layer 446 over a first substrate 441 with a liquid crystal layer 444 provided therebetween. Note that in the liquid crystal display device in FIGS. 7A and 7B, an alignment film 460a is provided between the transparent electrode layer 447 and the liquid crystal layer 444 and between the reflective electrode layer 446 and the liquid crystal layer 444, an alignment film 460b is provided between the common electrode layer 448 and the liquid crystal layer 444. The alignment films 460a and 460b are insulating layers having a function of controlling alignment of liquid crystal and therefore, are not necessarily provided depending on a material of the liquid crystal.

The transistor 450 is an example of a bottom-gate inverted-staggered transistor, and includes the gate electrode layer 401, a gate insulating layer 402, a semiconductor layer 404, the source or drain electrode layer 405a, and a source or drain electrode layer 405b. In addition, the capacitor wiring layer 408 which is formed in the same step as the gate electrode layer 401, the gate insulating layer 402, and a conductive layer 449 which is formed in the same step as the source or drain electrode layer 405a and the source or drain electrode layer 405b are stacked to form a capacitor. Note that the reflective electrode layer 446 which is formed using a reflective conductive film of aluminum (Al), silver (Ag), or the like is preferably provided to overlap with the capacitor wiring layer 408.

The semi-transmissive liquid crystal display device in this embodiment performs, by control of on and off the transistor 450, color display of moving images in the transmissive region 499 and monochrome (black and white) display of still images in the reflective region 498.

In the transmissive region 499, display is performed by incident light from a backlight provided on the first substrate 441 side. Light-emitting diodes (LEDs) of R, and B are used for the backlight so that color display can be performed. In this embodiment, a successive additive color mixing method (a field sequential method) in which color display is performed by time division using light-emitting diodes (LEDs) is employed On the other hand, in the reflective region 498, display is performed by reflecting external light incident from the second substrate 442 side by the reflective electrode layer 446.

Figure 8:
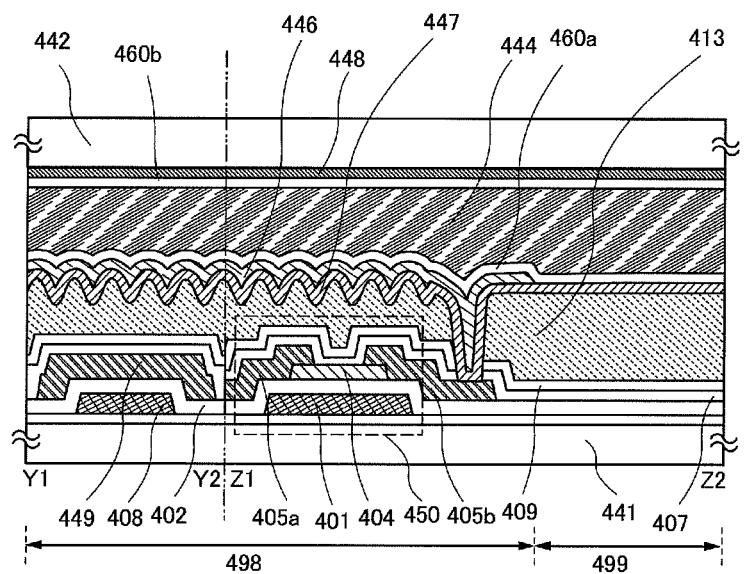
FIG. 8 illustrates one mode of a liquid crystal display device.
Figure 9:
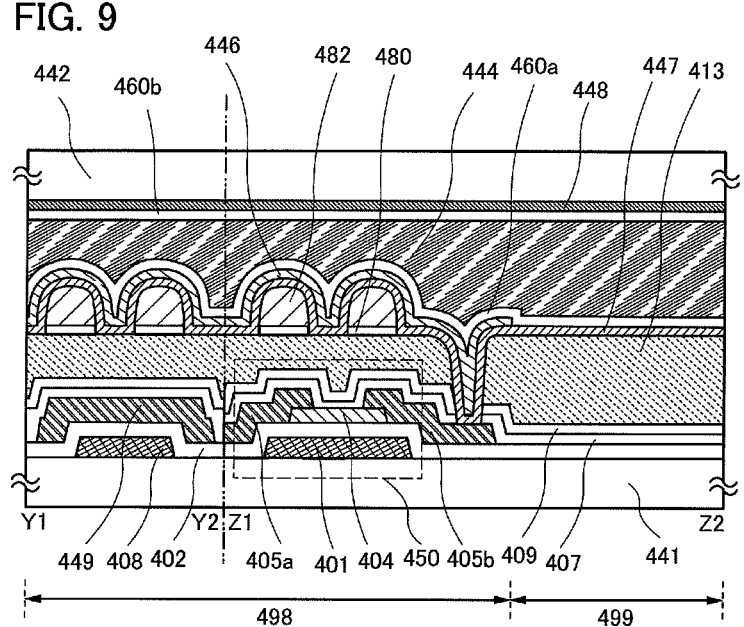
FIG. 9 illustrates one mode of a liquid crystal display device.

Examples in which the reflective electrode layer 446 is formed to have an uneven shape in the liquid crystal display device are illustrated in FIG. 8 and FIG. 9. FIG. 8 and FIG. 9 are cross-sectional views along lines Y1-Y2 and Z1-Z2 respectively, in the case where the reflective electrode layer 446 is formed to have an uneven shape in FIG. 7A. FIG. 8 illustrates an example in which a surface of the interlayer film 413 in the reflective region 498 is formed to have an uneven shape so that the reflective electrode layer 446 has unevenness. The uneven shape of the surface of the interlayer film 413 may be formed by performing selective etching. The interlayer film 413 having the uneven shape can be formed, for example, by performing a photolithography step on a photosensitive organic resin. FIG. 9 illustrates an example in which projected structures are provided over the interlayer film 413 in the reflective region 498 so that the reflective electrode layer 446 has an uneven shape. Note that in FIG. 9, the projected structures are formed by stacking an insulating layer 480 and an insulating layer 482. For example, an inorganic insulating layer of silicon oxide, silicon nitride, or the like can be used as the insulating layer 480, and an organic resin such as a polyimide resin or an acrylic resin can be used for the insulating layer 482. First, a silicon oxide film is formed over the interlayer film 413 by a sputtering method, and a polyimide resin film is formed over the silicon oxide film by a coating method. The polyimide resin film is etched with the use of the silicon oxide film as an etching stopper. The silicon oxide film is etched with the use of the etched polyimide resin layer as a mask, so that the projected structures formed of a stack of the insulating layer 480 and the insulating layer 482 can be formed as illustrated in FIG. 9.

As illustrated in FIG. 8 and FIG. 9, when the surface of the reflective electrode layer 446 has an uneven shape, incident external light is reflected diffusely, so that more favorable display can be performed. Accordingly, visibility of display is improved.

Figure 10A:
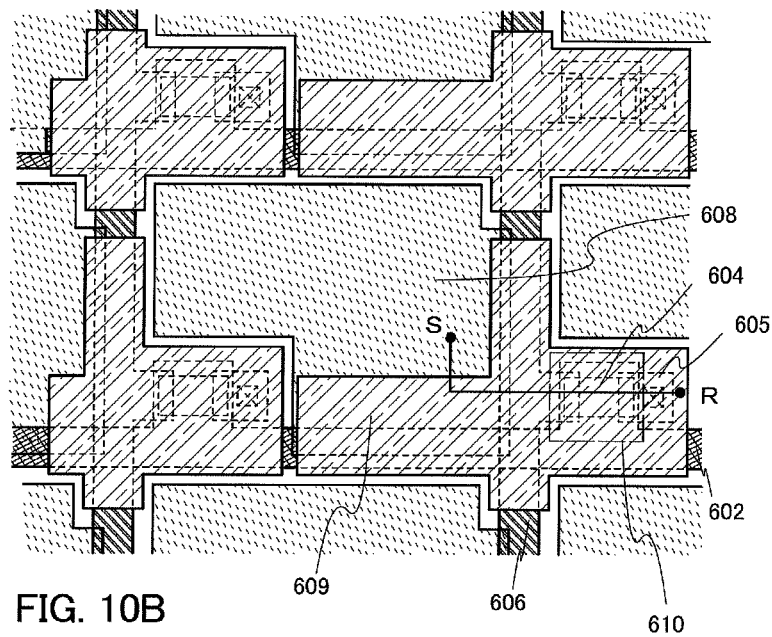
FIGS. 10A and 10B illustrate one mode of a liquid crystal display device.

An example of a pixel electrode in a liquid crystal display device, including both of a region which reflects light incident through a liquid crystal layer and a region which has a light-transmitting property will be described below. FIG. 10A is an example of a top view of a pixel, and a cross section taken along line S-R in FIG. 10A corresponds to FIG. 10B.

Figure 10B:
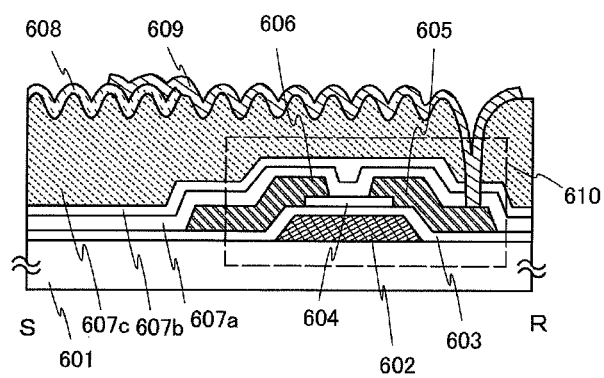

FIG. 10B illustrates a transistor 610 including at least a gate wiring layer 602, a gate insulating layer 603, an oxide semiconductor layer 604, a source wiring layer 606, and a drain wiring layer 605 over a substrate 601. The transistor 610 can be formed in the same steps as the transistor 450. The oxide semiconductor layer 604 is covered with a stacked layer of a first interlayer insulating layer 607a and a second interlayer insulating layer 607b. The first interlayer insulating layer 607a is an oxide insulating layer (typically, a silicon oxide film obtained by a sputtering method) and the second interlayer insulating layer 607b is a nitride insulating layer (typically, a silicon nitride film obtained by a sputtering method).

In a liquid crystal display device having the pixel structure illustrated in FIG. 10A, plural kinds of LEDs serving as a backlight are sequentially lit so that a moving image and a still image can be displayed in full color. In addition, a monochrome still image can be displayed by turning off the backlight, applying voltage to a reflective electrode layer 609, and adjusting the amount of light passing through the liquid crystal layer over the reflective electrode layer 609.

In the pixel illustrated in FIG. 10A, a transparent electrode layer 608 and the reflective electrode layer 609 which partly overlaps with the transparent electrode layer 608 are combined to function as one pixel electrode layer. A display region in full-color display is a region where the transparent electrode layer 608 does not overlap with the reflective electrode layer 609. A display region in mono-color display corresponds to the area of the reflective electrode layer 609.

As illustrated in FIG. 10B, the pixel electrode layer is formed over a third interlayer insulating layer 607c having an uneven shape, thereby having an uneven surface. The surface of the reflective electrode layer 609 is made to have an uneven shape so that mirror reflection is prevented, and display is performed by reflecting light diffusely at the surface.

This embodiment can be freely combined with other embodiments.

Embodiment 5

In this embodiment, an example of a transistor which can be applied to a liquid crystal display device disclosed in this specification is described. There is no particular limitation on a structure of a transistor which can be applied to a liquid crystal display device disclosed in this specification. For example, a top-gate structure or a bottom-gate structure such as a staggered type and a planar type can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned above and below a channel region with a gate insulating layer interposed therebetween. FIGS. 11A to 11D each illustrate an example of a cross-sectional structure of a transistor. Transistors illustrated in FIGS. 11A to 11D are transistors using an oxide semiconductor as a semiconductor. An advantage of using an oxide semiconductor is that high mobility and low off-state current can be obtained in a relatively easy and low-temperature process; however, it is needless to say that another semiconductor may be used.

Figure 11A:
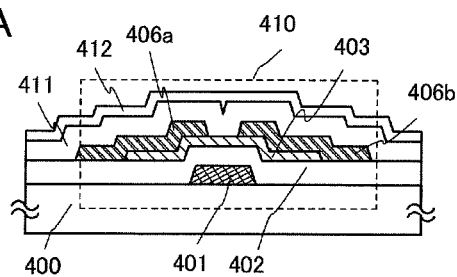
FIGS. 11A to 11D each illustrate one mode of a transistor which can be applied to a liquid crystal display device.

A transistor 410 illustrated in FIG. 11A is one of bottom-gate thin film transistors, and is also referred to as an inverted staggered thin film transistor.

The transistor 410 includes, over a substrate 400 having an insulating surface, the gate electrode layer 401, the gate insulating layer 402, an oxide semiconductor layer 403, a source electrode layer 406a, and a drain electrode layer 406b. In addition, an insulating layer 411 which covers the transistor 410 and is stacked over the oxide semiconductor layer 403 is provided. A protective insulating layer 412 is provided over the insulating layer 411.

Figure 11B:
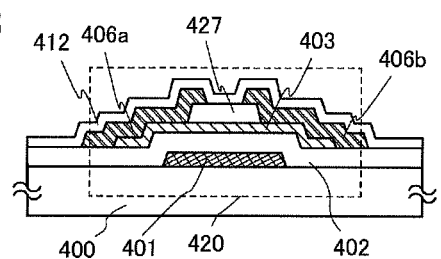

A transistor 420 illustrated in FIG. 11B is one of bottom-gate thin film transistors referred to as a channel-protective type (channel-stop type) and is also referred to as an inverted staggered thin film transistor.

The transistor 420 includes, over the substrate 400 having an insulating surface, the gate electrode layer 401, the gate insulating layer 402, the oxide semiconductor layer 403, an insulating layer 427 functioning as a channel protective layer which covers a channel formation region of the oxide semiconductor layer 403, the source electrode layer 406a, and the drain electrode layer 406b. The protective insulating layer 412 is formed so as to cover the transistor 420.

Figure 11C:
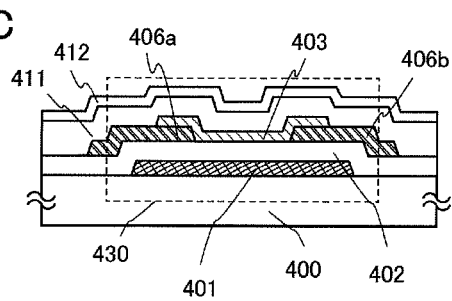

A transistor 430 illustrated in FIG. 11C is a bottom-gate thin film transistor, and includes, over the substrate 400 having an insulating surface, the gate electrode layer 401, the gate insulating layer 402, the source electrode layer 406a, the drain electrode layer 406b, and the oxide semiconductor layer 403. The insulating layer 411 which covers the transistor 430 and is in contact with the oxide semiconductor layer 403 is provided. The protective insulating layer 412 is provided over the insulating layer 411.

In the transistor 430, the gate insulating layer 402 is provided on and in contact with the substrate 400 and the gate electrode layer 401, and the source electrode layer 406a and the drain electrode layer 406b are provided on and in contact with the gate insulating layer 402. Further, the oxide semiconductor layer 403 is provided over the gate insulating layer 402, the source electrode layer 406a, and the drain electrode layer 406b.

Figure 11D:
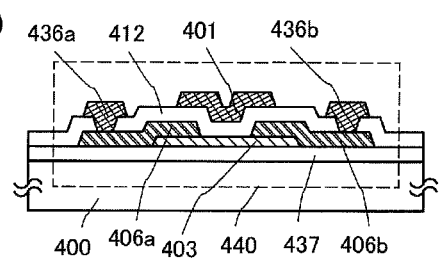

A thin film transistor 440 illustrated in FIG. 11D is one of top-gate thin film transistors. The transistor 440 includes, over the substrate 400 having an insulating surface, an insulating layer 437, the oxide semiconductor layer 403, the source electrode layer 406a, the drain electrode layer 406b, the gate insulating layer 402, and the gate electrode layer 401. A wiring layer 436a and a wiring layer 436b are provided to be in contact with and electrically connected to the source electrode layer 406a and the drain electrode layer 406b, respectively.

In this embodiment, as described above, the oxide semiconductor layer 403 is used as a semiconductor layer. As an oxide semiconductor used for the oxide semiconductor layer 403, an In—Sn—Ga—Zn—O-based oxide semiconductor layer which is an oxide of four metal elements; an In—Ga—Zn—O-based oxide semiconductor layer, an In—Sn—Zn—O-based oxide semiconductor layer, an In—Al—Zn—O-based oxide semiconductor layer, a Sn—Ga—Zn—O-based oxide semiconductor layer, an Al—Ga—Zn—O-based oxide semiconductor layer, or a Sn—Al—Zn—O-based oxide semiconductor layer which are oxides of three metal elements; an In—Zn—O-based oxide semiconductor layer, a Sn—Zn—O-based oxide semiconductor layer, an Al—Zn—O-based oxide semiconductor layer, a Zn—Mg—O-based oxide semiconductor layer, a Sn—Mg—O-based oxide semiconductor layer, or an In—Mg—O-based oxide semiconductor layer which are oxides of two metal elements; or an In—O-based oxide semiconductor layer, a Sn—O-based oxide semiconductor layer, or a Zn—O-based oxide semiconductor layer which are oxides of one metal element can be used. Further, $SiO_2$ may be contained in the above oxide semiconductor. Here, for example, an In—Ga—Zn—O-based oxide semiconductor is an oxide semiconductor including at least In, Ga, and Zn, and there is no particular limitation on the composition ratio thereof. Further, the In—Ga—Zn—O-based oxide semiconductor may contain an element other than In, Ga, and Zn.

For the oxide semiconductor layer 403, an oxide semiconductor represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In the transistors 410, 420, 430, and 440 each including the oxide semiconductor layer 403, a current value in an off-state (off-state current value) can be reduced. Therefore, an electrical signal of image data and the like can be held for a longer period of time, so that a writing interval can be set long. Accordingly, frequency of refresh operation can be reduced, which leads to an effect of suppressing power consumption.

Further, in the transistors 410, 420, 430, and 440 each including the oxide semiconductor layer 403, relatively high field-effect mobility can be obtained, whereby high-speed operation is possible. Therefore, by using any of the transistors in a pixel portion of a liquid crystal display device, color separation can be suppressed and high-quality image can be provided. Since the transistors can be separately formed over one substrate in a circuit portion and a pixel portion, the number of components can be reduced in the liquid crystal display device.

Although there is no particular limitation on a substrate used for the substrate 400 having an insulating surface, a glass substrate of barium borosilicate glass, aluminoborosilicate glass, or the like can be used.

In the bottom-gate transistors 410, 420, and 430, an insulating film serving as a base film may be provided between the substrate and the gate electrode layer. The base film has a function of preventing diffusion of an impurity element from the substrate, and can be formed to have a single-layer or stacked-layer structure using one or more films selected from a silicon nitride film, a silicon oxide film, a silicon nitride oxide film, and a silicon oxynitride film.

The gate electrode layer 401 can be formed to have a single-layer or stacked-layer structure using a metal material such as molybdenum, titanium, chromium, tantalum, tungsten, aluminum, copper, neodymium, or scandium, or an alloy material which contains any of these materials as its main component.

The gate insulating layer 402 can be formed to have a single-layer or stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, by a plasma CVD method, a silicon nitride layer ($SiN_y$ (y>0)) with a thickness of greater than or equal to 50 nm and less than or equal to 200 nm is formed as a first gate insulating layer, and a silicon oxide layer ($SiO_x$ (x>0)) with a thickness of greater than or equal to 5 nm and less than or equal to 300 nm is formed as a second gate insulating layer over the first gate insulating layer, so that a gate insulating layer with a total thickness of 200 nm is formed.

A conductive film used for the source electrode layer 406a and the drain electrode layer 406b can be formed using an element selected from Al, Cr, Cu, Ta, Ti, Mo, and W, an alloy film containing any of these elements, an alloy film containing a combination of any of these elements, or the like. Alternatively, a structure may be employed in which a high-melting-point metal layer of Ti, Mo, W, or the like is stacked over one of or both of the upper side and lower side of a metal layer of Al, Cu, or the like. In addition, heat resistance can be improved by using an Al material to which an element (Si, Nd, Sc, or the like) which prevents generation of a hillock or a whisker in an Al film is added.

A material similar to that of the source electrode layer 406a and the drain electrode layer 406b can be used for a conductive film such as the wiring layer 436a and the wiring layer 436b which are connected to the source electrode layer 406a and the drain electrode layer 406b, respectively.

Alternatively, the conductive film to be the source electrode layer 406a and the drain electrode layer 406b (including a wiring layer formed in the same layer as the source electrode layer 406a and the drain electrode layer 406b) may be formed using conductive metal oxide. As conductive metal oxide, indium oxide ($In_2O_3$), tin oxide ($SnO_2$), zinc oxide (ZnO), indium oxide-tin oxide alloy ($In_2O_3$—$SnO_2$, which is abbreviated to ITO), indium oxide-zinc oxide alloy ($In_2O_3$—ZnO), or any of these metal oxide materials in which silicon oxide is contained can be used.

As the insulating layers 411, 427, and 437, typically, an inorganic insulating film such as a silicon oxide film, a silicon oxynitride film, an aluminum oxide film, or an aluminum oxynitride film can be used.

As the protective insulating layer 412, an inorganic insulating film such as a silicon nitride film, an aluminum nitride film, a silicon nitride oxide film, or an aluminum nitride oxide film can be used.

In addition, a planarization insulating film may be formed over the protective insulating layer 412 in order to reduce surface unevenness due to the transistor. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed using these materials.

Thus, in this embodiment, a high-performance liquid crystal display device can be provided by using a transistor including an oxide semiconductor layer.

Embodiment 6

In this embodiment, an example of a transistor including an oxide semiconductor layer and an example of a manufacturing method thereof are described in detail with reference to FIGS. 12A to 12E. The same portions as those in the above embodiments and portions having functions similar to those of the portions in the above embodiments and steps similar to those in the above embodiments may be handled as in the above embodiments, and repeated description is omitted. In addition, detailed description of the same portions is not repeated.

FIGS. 12A to 12E illustrate an example of a cross-sectional structure of a transistor. A transistor 510 of which the manufacturing steps are illustrated in FIGS. 12A to 12E is a bottom-gate inverted-staggered thin film transistor which is similar to the transistor 410 illustrated in FIG. 11A.

An oxide semiconductor used for a semiconductor layer in this embodiment is an i-type (intrinsic) oxide semiconductor or a substantially i-type (intrinsic) oxide semiconductor. The i-type (intrinsic) oxide semiconductor or substantially i-type (intrinsic) oxide semiconductor is obtained in such a manner that hydrogen, which is an n-type impurity, is removed from an oxide semiconductor, and the oxide semiconductor is highly purified so as to contain as few impurities that are not main components of the oxide semiconductor as possible. In other words, a highly-purified i-type (intrinsic) semiconductor or a semiconductor close thereto is obtained not by adding impurities but by removing impurities such as hydrogen or water as much as possible. Accordingly, the oxide semiconductor layer included in the transistor 510 is an oxide semiconductor layer which is highly purified and made to be electrically i-type (intrinsic).

In addition, a highly-purified oxide semiconductor includes extremely few carriers (close to zero), and the carrier concentration thereof is less than $1 \times 10^{14}/cm^3$, preferably less than $1 \times 10^{12}/cm^3$, more preferably less than $1 \times 10^{11}/cm^3$.

Since the oxide semiconductor includes extremely few carriers, off-state current can be reduced in a transistor including an oxide semiconductor layer. The smaller the amount of off-state current is, the better.

Specifically, in the transistor including the oxide semiconductor layer, off-state current density per micrometer in a channel width at room temperature can be less than or equal to 10 aA/μm ($1 \times 10^{-17}$ A/μm), further less than or equal to 1 aA/μm ($1 \times 10^{-18}$ A/μm), or still further less than or equal to 10 zA/μm ($1 \times 10^{-20}$ A/μm).

When a transistor whose current value in an off state (an off-state-current value) is extremely small is used as a transistor in the pixel portion of Embodiment 1, a number of refresh operations in a still image region can be reduced.

In addition, in the transistor 510 including the oxide semiconductor layer, the temperature dependence of on-state current is hardly observed, and off-state current remains extremely small.

Steps of manufacturing the transistor 510 over a substrate 505 are described below with reference to FIGS. 12A to 12E.

First, a conductive film is formed over the substrate 505 having an insulating surface, and then, a gate electrode layer 511 is formed in a first photolithography step. Note that a resist mask may be formed by an inkjet method. Formation of the resist mask by an inkjet method needs no photomask; thus, manufacturing cost can be reduced.

As the substrate 505 having an insulating surface, a substrate similar to the substrate 400 described in Embodiment 5 can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505, and can be formed with a single-layer structure or a stacked structure using one or more of a silicon nitride film, a silicon oxide film, a silicon nitride oxide film, and a silicon oxynitride film.

In addition, the gate electrode layer 511 can be formed to have a single-layer structure or a stacked structure using a metal material such as molybdenum, titanium, tantalum, tungsten, aluminum, copper, neodymium, or scandium, or an alloy material which contains any of these materials as its main component.

Next, a gate insulating layer 507 is formed over the gate electrode layer 511. The gate insulating layer 507 can be formed to have a single-layer structure or a stacked structure using a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer, by a plasma CVD method, a sputtering method, or the like.

As the oxide semiconductor layer in this embodiment, an oxide semiconductor which is made to be an i-type or substantially i-type by removing impurities is used. Such a highly-purified oxide semiconductor is extremely sensitive to an interface level or interface charge; therefore, an interface between the oxide semiconductor layer and the gate insulating layer is important. For that reason, the gate insulating layer that is to be in contact with a highly-purified oxide semiconductor needs to have high quality.

For example, a high-density plasma CVD method using microwaves (e.g., a frequency of 2.45 GHz) is preferably adopted because an insulating layer can be dense and can have high withstand voltage and high quality. When a highly-purified oxide semiconductor and a high-quality gate insulating layer are in contact with each other, the interface level can be reduced and interface characteristics can be favorable.

It is needless to say that another deposition method such as a sputtering method or a plasma CVD method can be employed as long as a high-quality insulating layer can be formed as a gate insulating layer. Moreover, it is possible to use as the gate insulating layer an insulating layer whose quality and characteristics of an interface with an oxide semiconductor are improved with heat treatment performed after the formation of the insulating layer. In any case, an insulating layer that can reduce interface level density with an oxide semiconductor to form a favorable interface, as well as having favorable film quality as the gate insulating layer, is formed.

Further, in order that hydrogen, a hydroxyl group, and moisture might be contained in the gate insulating layer 507 and an oxide semiconductor film 530 as little as possible, it is preferable that the substrate 505 over which the gate electrode layer 511 is formed or the substrate 505 over which layers up to the gate insulating layer 507 are formed be preheated in a preheating chamber of a sputtering apparatus as pretreatment for deposition of the oxide semiconductor film 530 so that impurities such as hydrogen and moisture adsorbed to the substrate 505 are eliminated and exhaustion is performed. As an exhaustion unit provided in the preheating chamber, a cryopump is preferable. Note that this preheating treatment can be omitted. This preheating step may be similarly performed on the substrate 505 over which layers up to a source electrode layer 515*a* and a drain electrode layer 515*b* are formed before formation of an insulating layer 516.

Figure 12A:
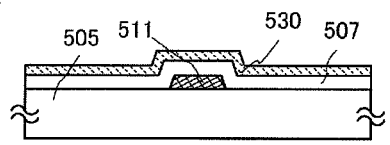
FIGS. 12A to 12E illustrate a method for manufacturing a transistor which can be applied to a liquid crystal display device.
Figure 12B:
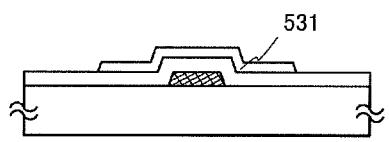

Next, the oxide semiconductor film 530 having a thickness of 2 nm to 200 nm inclusive, preferably 5 nm to 30 nm inclusive is formed over the gate insulating layer 507 (see FIG. 12A).

Note that before the oxide semiconductor film 530 is formed by a sputtering method, powder substances (also referred to as particles or dust) which are generated at the time of the deposition and attached on a surface of the gate insulating layer 507 are preferably removed by reverse sputtering in which an argon gas is introduced and plasma is generated. The reverse sputtering refers to a method in which, without application of a voltage to a target side, an RF power source is used for application of a voltage to a substrate side in an argon atmosphere to generate plasma in the vicinity of the substrate to modify a surface. Note that instead of an argon atmosphere, a nitrogen atmosphere, a helium atmosphere, an oxygen atmosphere, or the like may be used.

As an oxide semiconductor used for the oxide semiconductor film 530, an oxide semiconductor described in Embodiment 5, such as an oxide of four metal elements, an oxide of three metal elements, an oxide of two metal elements, an In—O-based oxide semiconductor, a Sn—O-based oxide semiconductor, or a Zn—O-based oxide semiconductor can be used. Further, $SiO_2$ may be contained in the above oxide semiconductor. In this embodiment, the oxide semiconductor film 530 is deposited by a sputtering method with the use of an In—Ga—Zn—O-based oxide semiconductor target A cross-sectional view of this stage is shown in FIG. 12A. Alternatively, the oxide semiconductor film 530 can be formed by a sputtering method in a rare gas (typically, argon) atmosphere, an oxygen atmosphere, or a mixed atmosphere of a rare gas and oxygen.

As a target for manufacturing the oxide semiconductor film 530 by a sputtering method, for example, a target having a composition ratio of $In_2O_3:Ga_2O_3:ZnO=1:1:1$ [molar ratio] (that is, In:Ga:Zn=1:1:0.5 [atomic ratio]) can be used. Alternatively, a target having a composition ratio of $In_2O_3:Ga_2O_3:ZnO=1:1:2$ [molar ratio] (that is, In:Ga:Zn=1:1:1 [atomic ratio]) or $In_2O_3:Ga_2O_3:ZnO=1:1:4$ [molar ratio] (that is, In:Ga:Zn=1:1:2 [atomic ratio]) can also be used. The filling rate of the oxide target is 90% to 100% inclusive, preferably, 95% to 99.9% inclusive. With use of the metal oxide target with high filling rate, the deposited oxide semiconductor film has high density.

It is preferable that a high-purity gas from which an impurity such as hydrogen, water, a hydroxyl group, or hydride is removed be used as the sputtering gas for the deposition of the oxide semiconductor film 530.

The substrate is placed in a deposition chamber under reduced pressure, and the substrate temperature is set to 100° C. to 600° C. inclusive, preferably 200° C. to 400° C. inclusive. Deposition is performed while the substrate is heated, whereby the concentration of an impurity contained in the oxide semiconductor layer formed can be reduced. In addition, damage by sputtering can be reduced. Then, moisture in the deposition chamber is removed, a sputtering gas from which hydrogen and moisture are removed is introduced, and the above-described target is used, so that the oxide semiconductor film 530 is formed over the substrate 505. In order to remove the moisture in the deposition chamber, an entrapment vacuum pump, for example, a cryopump, an ion pump, or a titanium sublimation pump is preferably used. The evacuation unit may be a turbo pump provided with a cold trap. In the deposition chamber which is evacuated with the cryopump, for example, a hydrogen atom, a compound containing a hydrogen atom, such as water ($H_2O$), (more preferably, also a compound containing a carbon atom), and the like are removed, whereby the concentration of an impurity in the oxide semiconductor film formed in the deposition chamber can be reduced.

As one example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulse direct current power source is preferable because powder substances (also referred to as particles or dust) generated in deposition can be reduced and the thickness distribution can be uniform.

Next, the oxide semiconductor film 530 is processed into an island-shaped oxide semiconductor layer in a second photolithography step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

For the etching of the oxide semiconductor film 530, either one or both of wet etching and dry etching may be employed. As an etchant used for wet etching of the oxide semiconductor film 530, for example, a mixed solution of phosphoric acid, acetic acid, and nitric acid (e.g., ITO07N (produced by Kanto Chemical Co., Inc.)), or the like can be used.

Next, first heat treatment is performed on the oxide semiconductor layer. The oxide semiconductor layer can be dehydrated or dehydrogenated by this first heat treatment. The temperature of the first heat treatment is higher than or equal to 400° C. and lower than or equal to 750° C., or higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, water or hydrogen is prevented from entering the oxide semiconductor layer without exposure to the air; thus, an oxide semiconductor layer 531 is obtained (see FIG. 12B).

Note that a heat treatment apparatus is not limited to an electrical furnace, and may include a device for heating an object to be processed by heat conduction or heat radiation from a heating element such as a resistance heating element. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high temperature gas, an inert gas which does not react with an object to be treated by heat treatment, such as nitrogen or a rare gas like argon, is used.

For example, as the first heat treatment, GRTA in which the substrate is moved into an inert gas heated to a high temperature as high as 650° C. to 700° C., heated for several minutes, and moved out of the inert gas heated to the high temperature may be performed.

Note that in the first heat treatment, it is preferable that water, hydrogen, and the like be not contained in the atmosphere of nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (that is, the impurity concentration is 1 ppm or lower, preferably 0.1 ppm or lower).

Further, after the oxide semiconductor layer is heated in the first heat treatment, a high-purity oxygen gas, a high-purity $N_2O$ gas, or an ultra-dry air (the dew point is lower than or equal to −40° C., preferably lower than or equal to −60° C.) may be introduced into the same furnace. It is preferable that water, hydrogen, and the like be not contained in an oxygen gas or an $N_2O$ gas. The purity of the oxygen gas or the $N_2O$ gas which is introduced into the heat treatment apparatus is preferably 6N or more, more preferably 7N or more (i.e., the concentration of impurities in the oxygen gas or the $N_2O$ gas is preferably 1 ppm or less, more preferably 0.1 ppm or less). By the action of the oxygen gas or the $N_2O$ gas, oxygen which is a main component included in the oxide semiconductor and which has been reduced at the same time as the step for removing impurities by dehydration or dehydrogenation is supplied, so that the oxide semiconductor layer can be a highly-purified and electrically i-type (intrinsic) oxide semiconductor.

In addition, the first heat treatment of the oxide semiconductor layer can also be performed on the oxide semiconductor film 530 which has not yet been processed into the island-shaped oxide semiconductor layer. In that case, the substrate is taken out from the heat apparatus after the first heat treatment, and then a photolithography step is performed.

Note that the first heat treatment may be performed at any of the following timings in addition to the above timing as long as it is performed after deposition of the oxide semiconductor layer: after a source electrode layer and a drain electrode layer are formed over the oxide semiconductor layer and after an insulating layer is formed over the source electrode layer and the drain electrode layer.

Further, the step of forming the contact hole in the gate insulating layer 507 may be performed either before or after the first heat treatment is performed on the semiconductor film 530.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness greater than or equal to 3 nm and less than or equal to 15 nm is deposited, and first heat treatment is performed in a nitrogen, an oxygen, a rare gas, or a dry air atmosphere at 450° C. to 850° C. inclusive or preferably 550° C. to 750° C. inclusive, so that a first oxide semiconductor film having a crystal region (including a plate-like crystal) in a region including a surface is formed. Then, a second oxide semiconductor film which has a larger thickness than the first oxide semiconductor film is formed, and second heat treatment is performed at 450° C. to 850° C. inclusive or preferably 600° C. to 700° C. inclusive, so that crystal growth proceeds upward with the use of the first oxide semiconductor film as a seed of the crystal growth and the whole second oxide semiconductor film is crystallized. In such a manner, the oxide semiconductor layer having a crystal region having a large thickness may be formed.

Next, a conductive film serving as the source electrode layer 515a and the drain electrode layer 515b (including a wiring formed in the same layer as the source electrode layer 515a and the drain electrode layer 515b) is formed over the gate insulating layer 507 and the oxide semiconductor layer 531. As the conductive film serving as the source electrode layer 515a and the drain electrode layer 515b, the material used for the source electrode layer 406a and the drain electrode layer 406b which is described in Embodiment 5 can be used.

Figure 12C:
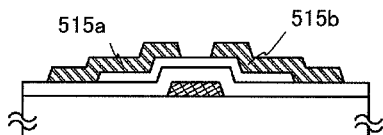

A resist mask is formed over the conductive film in a third photolithography step, and the source electrode layer 515a and the drain electrode layer 515b are formed by selective etching, and then, the resist mask is removed (see FIG. 12C).

Light exposure at the time of the formation of the resist mask in the third photolithography step may be performed using ultraviolet light, KrF laser light, or ArF laser light. A channel length L of a transistor that is completed later is determined by a distance between bottom end portions of the source electrode layer and the drain electrode layer, which are adjacent to each other over the oxide semiconductor layer 531. In the case where light exposure is performed for a channel length L of less than 25 sun, the light exposure at the time of the formation of the resist mask in the third photolithography step may be performed using extreme ultraviolet having an extremely short wavelength of several nanometers to several tens of nanometers. Light exposure with extreme ultraviolet leads to a high resolution and a large depth of focus. Thus, the channel length L of the transistor that is completed later can be greater than or equal to 10 nm and less than or equal to 1000 nm and the operation speed of a circuit can be increased and furthermore the value of off-state current is extremely small, so that low power consumption can be achieved.

In order to reduce the number of photomasks used in a photolithography step and reduce the number of photolithography steps, an etching step may be performed with the use of a multi-tone mask which is a light-exposure mask through which light is transmitted to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be realized.

Note that it is preferable that etching conditions be optimized so as not to etch and divide the oxide semiconductor layer 531 when the conductive film is etched. However, it is difficult to obtain etching conditions in which only the conductive film is etched and the oxide semiconductor layer 531 is not etched at all. In some cases, only part of the oxide semiconductor layer 531 is etched when the conductive film is etched, whereby the oxide semiconductor layer 531 having a groove portion (a recessed portion) is formed.

In this embodiment, since the Ti film is used as the conductive film and the In—Ga—Zn—O-based oxide semiconductor is used as the oxide semiconductor layer 531, a mixed solution of phosphoric acid, acetic acid, and nitric acid is used as an etchant for etching the conductive film.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 is formed without exposure to the air as a protective insulating film in contact with part of the oxide semiconductor layer.

The insulating layer 516 can be formed to a thickness of at least 1 nm by a method by which an impurity such as water or hydrogen does not enter the insulating layer 516, such as a sputtering method as appropriate. When hydrogen is contained in the insulating layer 516, entry of the hydrogen to the oxide semiconductor layer, or extraction of oxygen in the oxide semiconductor layer by the hydrogen may occur, thereby causing the backchannel of the oxide semiconductor layer to have lower resistance (to be n-type), so that a parasitic channel may be formed. Therefore, it is important that a deposition method in which hydrogen is not used is employed in order to form the insulating layer 516 containing as little hydrogen as possible.

In this embodiment, a silicon oxide film is formed to a thickness of 200 nm as the insulating layer 516 with a sputtering method. The substrate temperature in deposition may be higher than or equal to room temperature and lower than or equal to 300° C. and in this embodiment, is 100° C. The silicon oxide film can be deposited by a sputtering method in a rare gas (typically, argon) atmosphere, an oxygen atmosphere, or a mixed atmosphere containing a rare gas and oxygen. As a target, a silicon oxide target or a silicon target may be used. For example, the silicon oxide film can be formed using a silicon target by a sputtering method in an atmosphere containing oxygen. As the insulating layer 516 which is formed in contact with the oxide semiconductor layer, an inorganic insulating film which does not include impurities such as moisture, a hydrogen ion, and OH⁻ and blocks entry of these from the outside is used. Typically, a silicon oxide film, a silicon oxynitride film, an aluminum oxide film, an aluminum oxynitride film, or the like is used.

In order to remove moisture in the deposition chamber of the insulating layer 516 as in the case of the deposition of the oxide semiconductor film 530, an entrapment vacuum pump (such as a cryopump) is preferably used. When the insulating layer 516 is deposited in the deposition chamber evacuated using a cryopump, the impurity concentration in the insulating layer 516 can be reduced. In addition, as an exhaustion unit for removing the moisture in the deposition chamber of the insulating layer 516, a turbo pump provided with a cold trap may be used.

It is preferable that a high-purity gas from which an impurity such as hydrogen, water, a hydroxyl group, or hydride is removed be used as the sputtering gas for the deposition of the insulating layer 516.

Next, second heat treatment is performed in an inert gas atmosphere or oxygen gas atmosphere (preferably at 200° C. to 400° C. inclusive, for example, 250° C. to 350° C. inclusive). For example, the second heat treatment is performed in a nitrogen atmosphere at 250° C. for one hour. In the second heat treatment, part of the oxide semiconductor layer (a channel formation region) is heated while being in contact with the insulating layer 516.

Through the above process, the first heat treatment is performed on the oxide semiconductor film so that an impurity such as hydrogen, moisture, a hydroxyl group, or hydride (also referred to as a hydrogen compound) is intentionally removed from the oxide semiconductor layer. Additionally, oxygen which is one of main components of an oxide semiconductor and is reduced at the same time as the step for removing an impurity can be supplied. Accordingly, the oxide semiconductor layer is highly purified to be an electrically i-type (intrinsic) semiconductor.

Figure 12D:
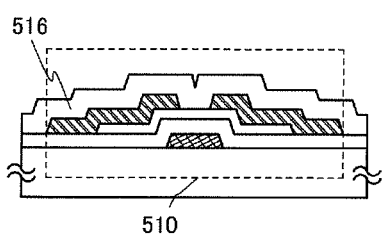
Figure 12E:
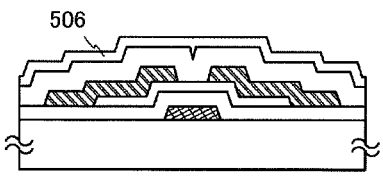

Through the above process, the transistor 510 is formed (FIG. 12D).

When a silicon oxide layer having a lot of defects is used as the oxide insulating layer, heat treatment after formation of the silicon oxide layer has an effect in diffusing an impurity such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be formed over the insulating layer 516. For example, a silicon nitride film is formed by an RF sputtering method. Since an RF sputtering method has high productivity, it is preferably used as a deposition method of the protective insulating layer. As the protective insulating layer, an inorganic insulating film which does not include an impurity such as moisture and prevents entry of these from the outside, such as a silicon nitride film or an aluminum nitride film is used. In this embodiment, the protective insulating layer 506 is formed using a silicon nitride film (see FIG. 12E).

In this embodiment, as the protective insulating layer 506, a silicon nitride film is formed by heating the substrate 505 over which layers up to the insulating layer 516 are formed, to a temperature of 100° C. to 400° C., introducing a sputtering gas containing high-purity nitrogen from which hydrogen and moisture are removed, and using a target of silicon semiconductor. In this case, the protective insulating layer 506 is preferably deposited removing moisture in a treatment chamber, similarly to the insulating layer 516.

After the formation of the protective insulating layer 506, heat treatment may be further performed at a temperature of 100° C. to 200° C. inclusive in the air for 1 hour to 30 hours inclusive. This heat treatment may be performed at a fixed heating temperature. Alternatively, the following change in the heating temperature may be conducted plural times repeatedly: the heating temperature is increased from a room temperature to a temperature of 100° C. to 200° C. and then decreased to a room temperature.

In this manner, with the use of the transistor including a highly-purified oxide semiconductor layer manufactured using this embodiment, the value of current in an off state (an off-state current value) can be further reduced. Accordingly, an electric signal such as image data can be held for a longer period and a writing interval can be set longer. Therefore, the frequency of refresh operation can be reduced, which leads to a higher effect of suppressing power consumption.

In addition, since the transistor including a highly-purified oxide semiconductor layer has high field-effect mobility, high-speed operation is possible. Accordingly, by using the transistor in a pixel portion of a liquid crystal display device, color separation can be suppressed and a high-quality image can be provided. In addition, since the transistors can be separately formed in a driver circuit portion and a pixel portion over one substrate, the number of components of the liquid crystal display device can be reduced.

This embodiment can be implemented in appropriate combination with any of the other embodiments.

Embodiment 7

In this embodiment, a pixel structure which enables increase in the amount of reflected light and transmitted light per one pixel in a semi-transmissive liquid crystal display device is described with reference to FIG. 13, FIGS. 14A to 14D, and FIG. 16.

Figure 13:
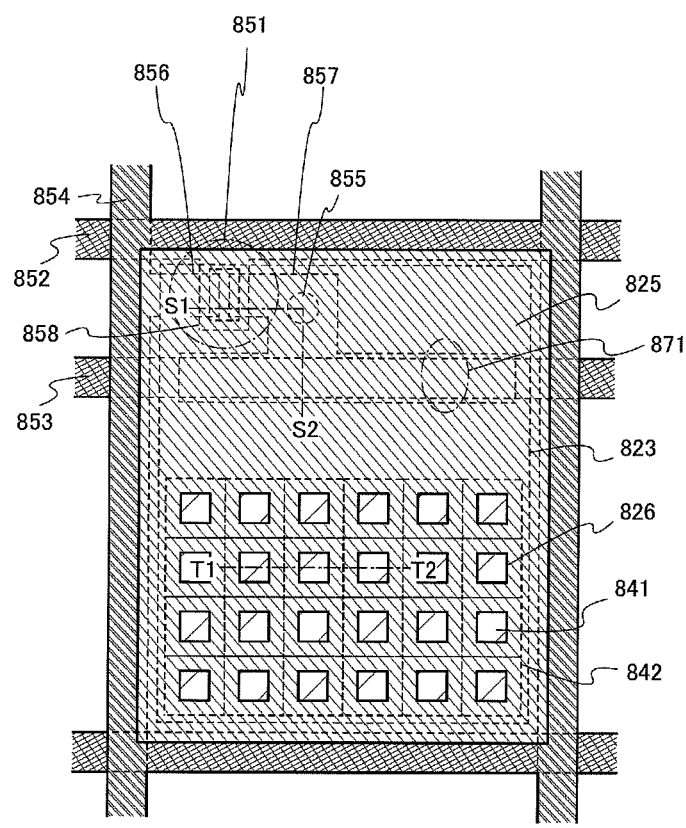
FIG. 13 illustrates one mode of a liquid crystal display device.
Figure 14B:
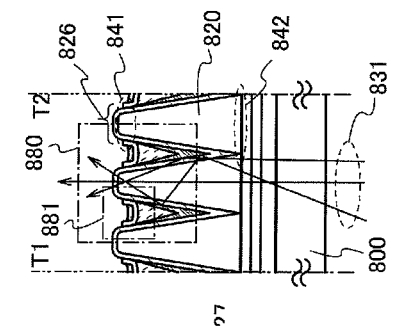
FIGS. 14A to 14D each illustrate one mode of a liquid crystal display device.
Figure 14D:
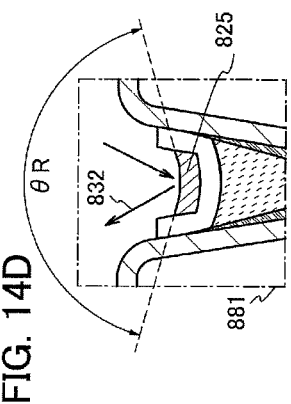
Figure 14A:
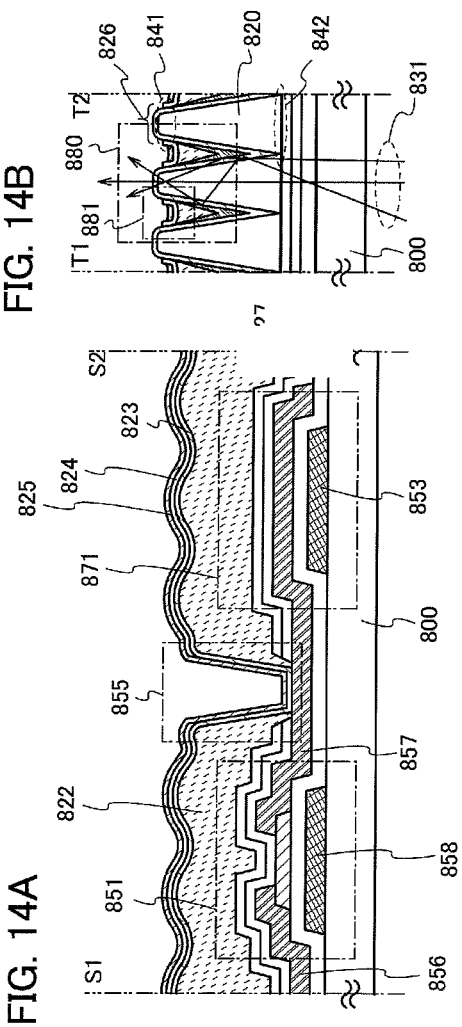

FIG. 13 is a view illustrating a plan structure of a pixel described in this embodiment. FIGS. 14A and 14B illustrate cross-sectional structures of a portion along S1-S2 and a portion along T1-T2 respectively, illustrated by dashed lines in FIG. 13. In a pixel described in this embodiment, a transparent electrode 823 and a reflective electrode 825 are stacked over a substrate 800, as a pixel electrode. The pixel electrode is connected to a drain electrode 857 of a transistor 851 through a contact hole 855 provided in an insulating film 827, an insulating film 828, and an organic resin film 822. The drain electrode 857 is overlapped with a capacitor wiring 853 with an insulating film interposed therebetween, so that a storage capacitor 871 is formed (see FIG. 14A).

A gate electrode 858 of the transistor 851 is connected to a wiring 852, and a source electrode 856 of the transistor 851 is connected to a wiring 854. The transistor described in other embodiments can be used as the transistor 851.

External light is reflected by the reflective electrode 825, so that the pixel electrode can function as a pixel electrode of a reflective liquid crystal display device. The reflective electrode 825 is provided with a plurality of openings 826. In the opening 826, the reflective electrode 825 does not exist, and a structure 820 and the transparent electrode 823 are projected. Light from the backlight is transmitted through the opening 826, so that the pixel electrode can function as a pixel electrode of a transmissive liquid crystal display device.

Figure 16:
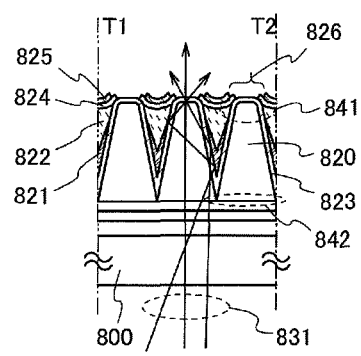
FIG. 16 illustrates one mode of a liquid crystal display device.

FIG. 16 is a cross-sectional view illustrating an example different from that in FIG. 14B, which is one embodiment of the present invention having a structure in which the structure 820 and the transparent electrode 823 are not projected in the opening 826. In FIG. 14B, a backlight exit 841 and the opening 826 have almost the same size. On the other hand, in FIG. 16, the backlight exit 841 and the opening 826 have different sizes and different distances from a backlight entrance 842. Accordingly, the amount of transmitted light can be made larger in FIG. 14B than in FIG. 16, and it can be said that the cross-sectional shape in FIG. 14B is preferable.

Figure 14C:
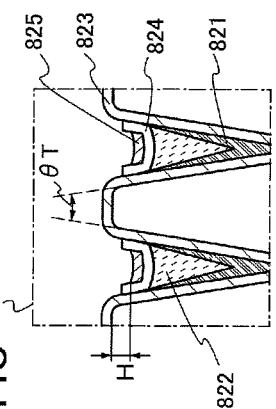

The structure 820 is formed to be overlapped with the opening 826. FIG. 14B is a cross-sectional view of the portion along T1-T2 in FIG. 13, which illustrates the structures of the pixel electrode and the structure 820. FIG. 14C is an enlarged view of a portion 880, and FIG. 14D is an enlarged view of a portion 881.

A reflected light 832 is external light reflected at the reflective electrode 825. The top surface of the organic resin film 822 is a curving surface with an uneven shape. By reflecting the curving surface with an uneven shape on the reflective electrode 825, the area of the reflective region can be increased, and reflection of an object other than the displayed image is reduced so that visibility of the displayed image can be improved. In the cross-sectional shape, the angle θR at a point where the reflective electrode 825 having a curving surface is most curved, formed by two inclined planes facing each other may be greater than or equal to 90°, preferably greater than or equal to 100° and less than or equal to 120° (see FIG. 14D).

The structure 820 includes the backlight exit 841 on the opening 826 side and the backlight entrance 842 on a backlight (not illustrated) side. The upper portion of the structure 820 is positioned above the surface of the reflective electrode 825 and protrudes from the upper end portion of the reflective electrode; that is, the distance H between the upper end portion of the structure 820 and the upper end portion of the reflective electrode is greater than or equal to 0.1 μm and less than or equal to 3 μm, preferably greater than or equal to 0.3 μm and less than or equal to 2 μm. The backlight entrance 842 is formed to have a larger area than that of the backlight exit 841. A reflective layer 821 is formed on the side surfaces of the structure 820 (surfaces on which the backlight exit 841 and the backlight entrance 842 are not formed). The structure 820 can be formed using a material having a light-transmitting property such as silicon oxide (SiOx), silicon nitride (SiNx), or silicon oxynitride (SiNO). The reflective layer 821 can be formed using a material with high light reflectance such as aluminum (Al) or silver (Ag).

A transmitted light 831 emitted from the backlight enters the structure 820 through the backlight entrance 842. Some of the incident transmitted light 831 is directly emitted from the backlight exit 841, some are reflected toward the backlight exit 841 by the reflective layer 821, and some are further reflected to return to the backlight entrance 842.

At this time, according to the shape of a cross section of the structure 820 passing through the backlight exit 841 and the backlight entrance 842 of the structure 820, side surfaces on right and left facing each other are inclined surfaces. The angle θT formed by the side surfaces is made to be less than 90°, preferably greater than or equal to 10° and less than or equal to 60°, so that the transmitted light 831 incident from the backlight entrance 842 can be guided efficiently to the backlight exit 841 (see FIG. 14C).

In a conventional semi-transmissive liquid crystal display device, when the area of an electrode in a pixel electrode, functioning as a reflective electrode is SR and the area of an electrode in a pixel electrode, functioning as a transmissive electrode (the area of the opening 826) is ST, the proportion of the total area of both electrodes is 100% (SR+ST=100%). In a semi-transmissive liquid crystal display device having a pixel structure described in this embodiment, the area ST of the electrode functioning as a transmissive electrode corresponds to the area of the backlight entrance 842, whereby the amount of transmitted light can be increased without increasing the area of the opening 826 or the luminance of the backlight. In other words, the proportion of the total area of both electrodes in appearance can be 100% or more (SR+ST is 100% or more).

By using this embodiment, a semi-transmissive liquid crystal display device with bright and high-quality display can be obtained without increasing power consumption.

This embodiment can be implemented in appropriate combination with the structures described in the other embodiments.

Embodiment 8

In this embodiment, an example of an electronic device including the liquid crystal display device described in any of the above embodiments will be described.

Figure 15A:
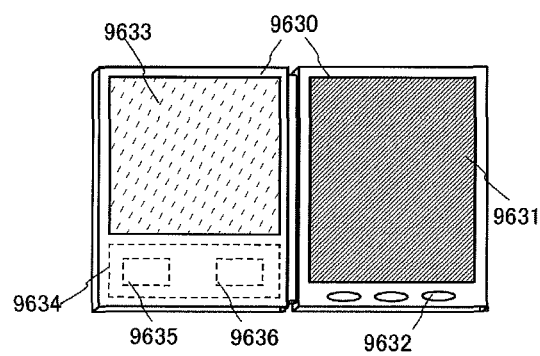
FIGS. 15A and 15B illustrate one mode of an electronic device and a block diagram thereof.

FIG. 15A illustrates an electronic book reader (also referred to as an e-book reader) which can include housings 9630, a display portion 9631, operation keys 9632, a solar battery 9633, and a charge and discharge control circuit 9634. The electronic book reader illustrated in FIG. 15A has a function of displaying various kinds of information (e.g., a still image, a moving image, and a text image) on the display portion, a function of displaying a calendar, a date, the time, or the like on the display portion, a function of operating or editing the information displayed on the display portion, a function of controlling processing by various kinds of software (programs), and the like. Note that in FIG. 15A, a structure including a battery 9635 and a DCDC converter (hereinafter abbreviated as a converter 9636) is illustrated as an example of the charge and discharge control circuit 9634.

The structure illustrated in FIG. 15A is preferable because power generation by the solar battery 9633 and charge in the battery 9635 are effectively performed, in which case use under a relatively bright condition is assumed when a semi-transmissive liquid crystal display device is used as the display portion 9631. Note that a structure in which the solar battery 9633 is provided on each of a surface and a rear surface of the housing 9630 is preferable in order to charge the battery 9635 efficiently. When a lithium ion battery is used as the battery 9635, there is an advantage of downsizing or the like.

Figure 15B:
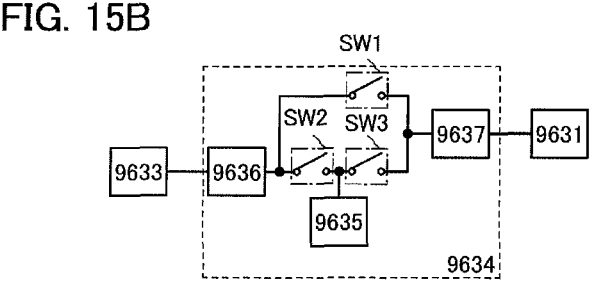

The structure and the operation of the charge and discharge control circuit 9634 illustrated in FIG. 15A are described with reference to a block diagram in FIG. 15B. The solar battery 9633, the battery 9635, the converter 9636, the converter 9637, switches SW1 to SW3, and the display portion 9631 are shown in FIG. 15B, and the battery 9635, the converter 9636, the converter 9637, and the switches SW1 to SW3 correspond to the charge and discharge control circuit 9634.

First, an example of operation in the case where power is generated by the solar battery 9633 using external light is described. The voltage of power generated by the solar battery is raised or lowered by the converter 9636 so that the power has a voltage for charging the battery 9635. Then, when the power from the solar battery 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and a switch SW2 is turned on so that charge of the battery 9635 may be performed.

Next, operation in the case where power is not generated by the solar battery 9633 using external light is described. The voltage of power accumulated in the battery 9635 is raised or lowered by the converter 9637 by turning on the switch SW3. Then, power from the battery 9635 is used for the operation of the display portion 9631.

Note that although the solar battery 9633 is described as an example of a means for charge, charge of the battery 9635 may be performed with another means. In addition, a combination of the solar battery 9633 and another means for charge may be used.

This embodiment can be implemented in appropriate combination with any of the structures described in the other embodiments.

This application is based on Japanese Patent Application serial no. 2009-298482 filed with Japan Patent Office on Dec. 28, 2009, the entire contents of which are hereby incorporated by reference.

The invention claimed is:

1. A liquid crystal display device comprising:
    a display panel, the display panel comprising:
        a plurality of pixels each including a transparent electrode, a reflective electrode, a transistor electrically connected to the transparent electrode and the reflective electrode; and
        a first driver circuit configured to drive the plurality of pixels;
    an image processing circuit, the image processing circuit comprising:
        a memory circuit capable of storing image signals in successive frame periods;
        a comparison circuit configured to compare the image signals in the successive frame periods and calculate a difference; and
        a display control circuit; and
    a backlight portion, the backlight portion comprising:
        a plurality of light emitting elements; and
        a second driver circuit configured to drive the plurality of light emitting elements,
    wherein the transistor has a channel formation region comprising an oxide semiconductor,
    wherein the transparent electrode is partly in contact with and overlapped with the reflective electrode,
    wherein the transparent electrode and the reflective electrode are each configured to control an orientation state of liquid crystal,
    wherein the display panel is configured to be driven in a moving-image display mode or a still-image display mode,
    wherein in the moving-image display mode, the comparison circuit judges successive frame periods during which the difference is detected as a moving-image display period, the image processing circuit outputs a first signal to the display panel, the first driver circuit drives the display panel, the image processing circuit outputs a second signal to the backlight portion, and the second driver circuit drives the backlight portion,
    wherein, in the still-image display mode, the comparison circuit judges successive frame periods during which the difference is not detected as a still-image display period and the image processing circuit stops the output of the second signal to the backlight portion,
    wherein the image processing circuit is configured to control a supply of a clock signal to the first driver circuit,
    wherein the image processing circuit is configured to supply the clock signal to the first driver circuit in the moving-image display mode,
    wherein a still-image holding period, in which the clock signal is not supplied to the first driver circuit so that operation of the first driver circuit is stopped, is provided in the still-image display mode, and
    wherein a still-image is displayed on the display panel during the still-image holding period.

2. The liquid crystal display device according to claim 1, wherein the plurality of light-emitting elements include first light-emitting elements emitting a first color, second light-emitting elements emitting a second color and third light-emitting elements emitting a third color.

3. The liquid crystal display device according to claim 1, further comprising a photometric circuit configured to detect a brightness and supply a signal to the second driver circuit for driving the plurality of light-emitting elements.

4. The liquid crystal display device according to claim 1, further comprising a field sequential signal generation circuit configured to compress a image signal from the display control circuit with respect to time axis.

5. An electronic device comprising the liquid crystal display device according to claim 1 and a solar battery, wherein the solar battery is attached to the display panel so as to be opened and closed, and electric power from the solar battery is supplied to the display panel, the backlight portion, and the image processing circuit.

6. A liquid crystal display device comprising:
a display panel, the display panel comprising:
a plurality of pixels, each including a transparent electrode, a reflective electrode, a transistor electrically connected to the transparent electrode and the reflective electrode; and
a first driver circuit configured to drive the plurality of pixels;
a backlight portion, the backlight portion comprising:
a plurality of light-emitting elements including first light-emitting elements emitting a first color, second light-emitting elements emitting a second color and third light-emitting elements emitting a third color; and
a second driver circuit configured to drive the plurality of light-emitting elements; and
an image processing circuit, the image processing circuit comprising:
a memory circuit configured to store image signals;
a comparison circuit configured to detect a difference among the image signals of successive frame periods stored in the memory circuit;
a selection circuit configured to select and output the image signals of the successive frame periods in accordance with the difference detected in the comparison circuit; and
a display control circuit configured to control supply of first signal to the first driver circuit and a second signal to the second driver circuit in accordance with an output signal from the selection circuit,
wherein the transistor has a channel formation region comprising an oxide semiconductor,
wherein the display control circuit is configured to stop the supply of the second signal in case the comparison circuit does not detect the difference,
wherein the first light-emitting elements, the second light-emitting elements and the third light-emitting elements are controlled by the second driver circuit to emit light sequentially,
wherein the image processing circuit is configured to control a supply of a clock signal to the first driver circuit so that operation of the first driver circuit is stopped,
wherein the image processing circuit is configured to supply the first signal and the clock signal in a first period and stop the supply of the first signal and the clock signal in a second period after the first period in the case where the comparison circuit does not detect the difference, and
wherein the display panel is configured to display a still-image based on an image signal written into the plurality of the pixels during a period in which the supply of the clock signal to the first driver circuit is stopped by the image processing circuit.

7. The liquid crystal display device according to claim 6, further comprising a photometric circuit configured to detect a brightness and supply a signal to the second driver circuit for driving the plurality of light-emitting elements.

8. The liquid crystal display device according to claim 6, further comprising a field sequential signal generation circuit configured to compress a image signal from the display control circuit with respect to time axis.

9. An electronic device comprising the liquid crystal display device according to claim 6 and a solar battery, wherein the solar battery is attached to the display panel so as to be opened and closed, and electric power from the solar battery is supplied to the display panel, the backlight portion, and the image processing circuit.

10. A liquid crystal display device comprising:
a display panel, the display panel comprising:
a plurality of pixels, each including a transistor and a pixel electrode; and
a first driver circuit operationally connected to the transistor,
wherein the pixel electrode comprises a transparent electrode and a reflective electrode, a backlight portion, the backlight portion comprising:
a plurality of light-emitting elements each having different emission colors; and
a second driver circuit; and
an image processing circuit,
wherein the transistor has a channel formation region comprising an oxide semiconductor,
wherein the transparent electrode is partly in contact with and overlapped with the reflective electrode,
wherein the image processing circuit comprises a memory circuit including a plurality of memories, a comparison circuit, a selection circuit and a display control circuit,
wherein the memory circuit is electrically connected to the comparison circuit and the selection circuit,
wherein the comparison circuit is electrically connected to the selection circuit and the display control circuit,
wherein the selection circuit is electrically connected to the display control circuit,
wherein the display control circuit is electrically connected to the first driver circuit and the second driver circuit,
wherein the comparison circuit is configured to detect a difference among image signals of successive frame periods,
wherein the display panel is configured to be driven in a moving-image display mode in the case where the comparison circuit detects the difference,
wherein the display panel is configured to be driven in a still-image display mode in the case where the comparison circuit does not detect the difference,
wherein the image processing circuit is configured to control a supply of a clock signal to the first driver circuit,
wherein the image processing circuit is configured to supply the clock signal to the first driver circuit in the moving-image display mode,
wherein a still-image holding period, in which the clock signal is not supplied to the first driver circuit so that operation of the first driver circuit is stopped, is provided in the still-image display mode, and
wherein a still-image is displayed on the display panel during the still-image holding period.

11. The liquid crystal display device according to claim 10, further comprising a photometric circuit configured to detect a brightness and supply a signal to the second driver circuit for driving the plurality of light-emitting elements.

12. The liquid crystal display device according to claim 10, wherein the plurality of light-emitting elements include first light-emitting elements emitting a first color, second light-emitting elements emitting a second color and third light-emitting elements emitting a third color and the second driver circuit controls the first, second and third light emitting elements to emit light sequentially.

13. The liquid crystal display device according to claim 10, further comprising a field sequential signal generation circuit configured to compress a image signal from the display control circuit with respect to time axis.

14. An electronic device comprising the liquid crystal display device according to claim 10 and a solar battery, wherein the solar battery is attached to the display panel so as to be opened and closed, and electric power from the solar battery is supplied to the display panel, the backlight portion, and the image processing circuit.

\* \* \* \* \*

UNITED STATES PATENT AND TRADEMARK OFFICE
CERTIFICATE OF CORRECTION

| | | |
|---|---|---|
| PATENT NO. | : 8,866,725 B2 | Page 1 of 1 |
| APPLICATION NO. | : 12/978788 | |
| DATED | : October 21, 2014 | |
| INVENTOR(S) | : Shunpei Yamazaki, Jun Koyama and Yoshiharu Hirakata | |

It is certified that error appears in the above-identified patent and that said Letters Patent is hereby corrected as shown below:

In the Specification

Column 5, Line 17 – replace "Gy" with --G,--;

Column 5, Line 20 – after "R," insert --G,--;

Column 7, Line 51 – after "R," insert --G,--;

Column 8, Line 29-30 – after "R," insert --G,--;

Column 8, Line 42-43 – after "R," insert --G,--;

Column 8, Line 47 – after "R," insert --G,--;

Column 14, Line 62 – after "R," insert --G,--;

Column 24, Line 38 – replace "sun," with --nm,--; and

Column 27, Line 65 – replace "OR" with --θR--.

Signed and Sealed this
Twenty-second Day of September, 2015

Michelle K. Lee
*Director of the United States Patent and Trademark Office*